US012757087B2

(12) United States Patent
Kung et al.

(10) Patent No.: US 12,757,087 B2

(45) Date of Patent: Oct. 6, 2026

(54) METHOD AND APPARATUS FOR TIMER HANDLING IN CONDITIONAL MOBILITY IN A WIRELESS COMMUNICATION SYSTEM

(71) Applicant: ASUS Technology Licensing Inc., Taipei City (TW)

(72) Inventors: Yi-Hsuan Kung, Taipei City (TW); Yu-Hsuan Guo, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/425,890

(22) Filed: Dec. 18, 2025

(65) Prior Publication Data

US 2026/0181502 A1 Jun. 25, 2026

Related U.S. Application Data

(60) Provisional application No. 63/743,217, filed on Jan. 8, 2025, provisional application No. 63/738,799, filed on Dec. 25, 2024.

(51) Int. Cl.
*H04W 36/08* (2009.01)
*H04W 36/00* (2009.01)

(52) U.S. Cl.
CPC ....... *H04W 36/08* (2013.01); *H04W 36/0072* (2013.01)

(58) Field of Classification Search
CPC ............... H04W 36/08; H04W 36/362; H04W 36/0077; H04W 36/00725; H04W 36/0072
See application file for complete search history.

(56) References Cited

U.S. PATENT DOCUMENTS

2024/0340717 A1* 10/2024 Karimidehkordi .......................... H04W 36/0072
2024/0340961 A1* 10/2024 Akl ........................ H04W 36/08
2024/0406815 A1* 12/2024 Lin .................... H04W 36/0072
2024/0422631 A1* 12/2024 Damnjanovic ... H04W 36/0072
2025/0031105 A1* 1/2025 Leng ................. H04W 36/0058
2025/0071647 A1* 2/2025 Hong .................. H04W 36/249
2025/0106713 A1* 3/2025 Jin .................... H04W 56/0045
(Continued)

FOREIGN PATENT DOCUMENTS

WO 2025039564 A1 2/2025
WO WO-2025034226 A1 * 2/2025 ........ H04W 74/0833
(Continued)

*Primary Examiner* — Mong-Thuy T Tran
(74) *Attorney, Agent, or Firm* — Skaar Ulbrich Macari, P.A.

(57) ABSTRACT

Methods, systems, and apparatuses are provided for timer handling in conditional mobility in a wireless communication system, wherein a method of a User Equipment (UE) comprises receiving a configuration of at least one candidate cell including a first candidate cell, starting or restarting a first timer, for time alignment, associated with the first candidate cell in response to receiving a Medium Access Control (MAC) Control Element (CE) indicating a Timing Advance (TA) associated with the first candidate cell, and if the UE determines to initiate a conditional Layer 1 (L1)/ Layer 2 (L2) Triggered Mobility (LTM) Cell switch on the first candidate cell, the UE starts a timeAlignmentTimer with a value based on remaining time of the first timer associated with the first candidate cell.

20 Claims, 15 Drawing Sheets

(56) References Cited

U.S. PATENT DOCUMENTS

| | | | | |
|---|---|---|---|---|
| 2025/0220529 | A1 | 7/2025 | Agiwal et al. | |
| 2025/0234257 | A1* | 7/2025 | Prasad | H04W 36/04 |
| 2025/0274187 | A1* | 8/2025 | Sung | H04W 36/085 |
| 2026/0006504 | A1* | 1/2026 | Da Silva | H04W 36/00725 |

FOREIGN PATENT DOCUMENTS

| | | | |
|---|---|---|---|
| WO | 2025147081 | A1 | 7/2025 |
| WO | WO-2026029697 | A1 * | 2/2026 |
| WO | WO-2026035588 | A1 * | 2/2026 |

* cited by examiner

<table>
<tr><td>C</td><td colspan="3">Target Config ID</td><td colspan="4">Timing Advance Command</td><td>Oct 1</td></tr>
<tr><td colspan="8">Timing Advance Command</td><td>Oct 2</td></tr>
<tr><td>R</td><td colspan="7">TCI state ID</td><td>Oct 3</td></tr>
<tr><td>R</td><td>R</td><td colspan="6">UL TCI state ID</td><td>Oct 4</td></tr>
<tr><td colspan="6">Random Access Preamble index</td><td colspan="2">SS/PBCH index</td><td>Oct 5</td></tr>
<tr><td colspan="4">SS/PBCH index</td><td colspan="4">PRACH Mask index</td><td>Oct 6</td></tr>
<tr><td>R</td><td>R</td><td>R</td><td>R</td><td>R</td><td>S/U</td><td colspan="2">Repetition Number</td><td>Oct 7</td></tr>
</table>

FIG. 5 (PRIOR ART)

METHOD AND APPARATUS FOR TIMER HANDLING IN CONDITIONAL MOBILITY IN A WIRELESS COMMUNICATION SYSTEM

CROSS-REFERENCE TO RELATED APPLICATIONS

The present Application claims priority to and the benefit of U.S. Provisional Patent Application Ser. No. 63/738,799, filed Dec. 25, 2024, and U.S. Provisional Patent Application Ser. No. 63/743,217, filed Jan. 8, 2025; with each of the referenced and identified applications and disclosures hereby fully incorporated herein by reference.

FIELD

This disclosure generally relates to wireless communication networks and, more particularly, to a method and apparatus for timer handling in conditional mobility in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for timer handling in conditional mobility in a wireless communication system, wherein timer handling is provided for conditional Random Access Channel (RACH)-less Layer 1 (L1)/Layer 2 (L2) Triggered Mobility (LTM).

In various embodiments, a method for a User Equipment (UE) in a wireless communication system comprises receiving a configuration of at least one candidate cell including a first candidate cell, starting or restarting a first timer, for time alignment, associated with the first candidate cell in response to receiving a Medium Access Control (MAC) Control Element (CE) indicating a Timing Advance (TA) associated with the first candidate cell, and if the UE determines to initiate a conditional LTM Cell switch on the first candidate cell, the UE starts a timeAlignmentTimer with a value based on remaining time of the first timer associated with the first candidate cell.

BRIEF DESCRIPTION OF THE DRAWINGS

FIG. 5 is a reproduction of FIG. 6.1.3.75-1: LTM Cell Switch Command MAC CE, from 3GPP TS 38.321 v18.3.0.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.321 v18.3.0; [2] 3GPP TS 38.331 v18.3.0; [3] 3GPP TS 38.300 v18.3.0; [4] 3GPP TS 38.211 v18.3.0; [5] 3GPP TS 38.213 v18.4.0; [6] RP-242356; and [7] Draft_RAN2_128_Meeting_Report. The standards and documents listed above are hereby expressly and fully incorporated herein by reference in their entirety.

Figure 1:
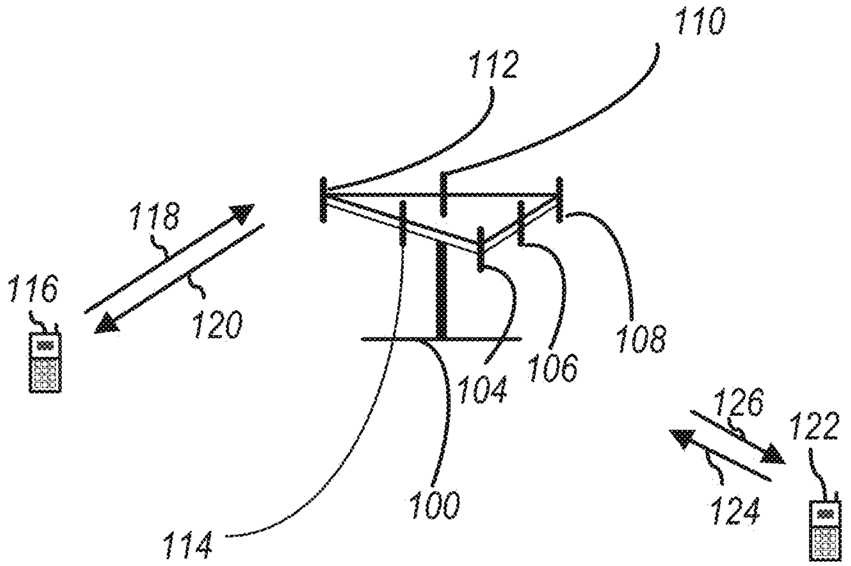
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
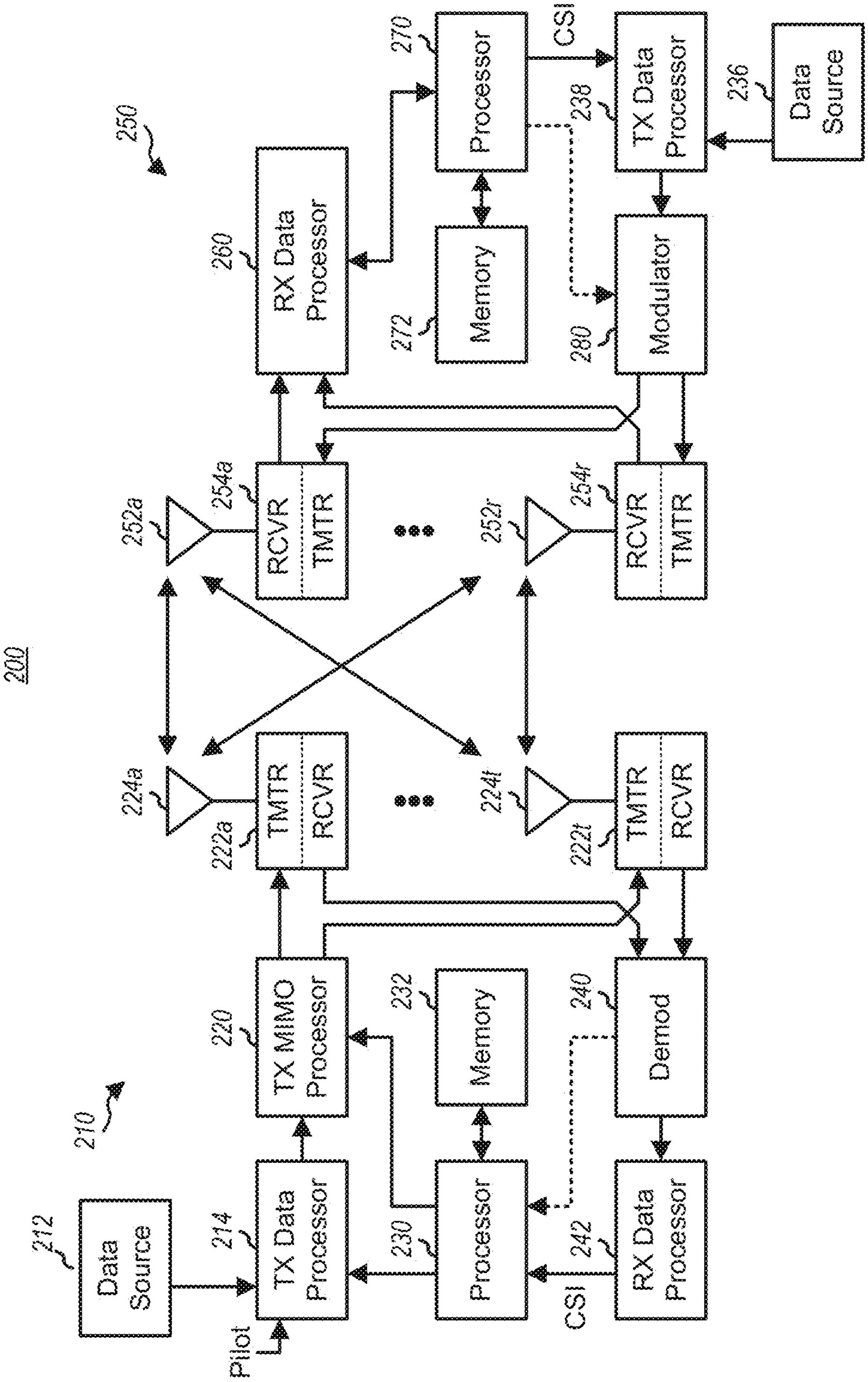
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254_a_ through 254_r_, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
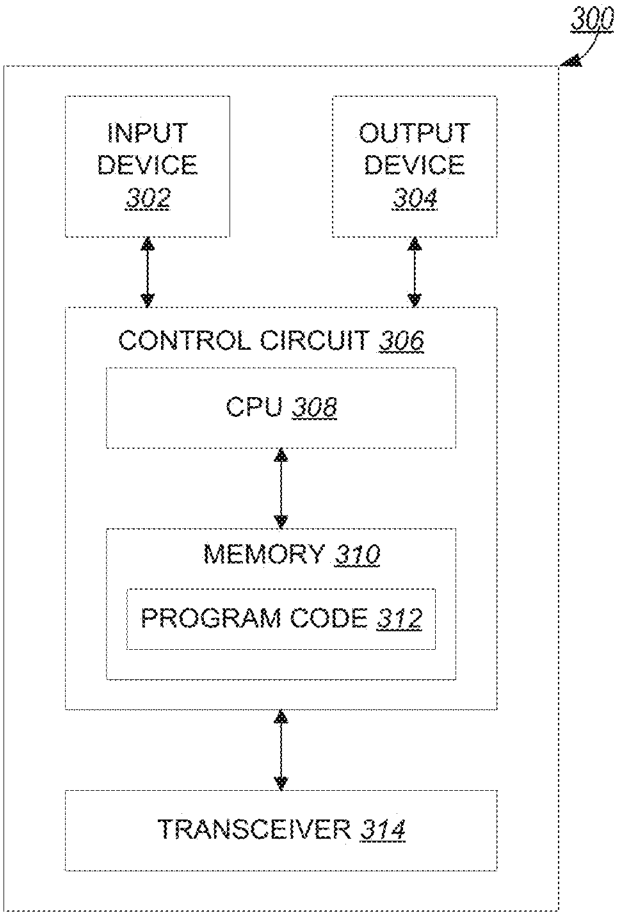
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
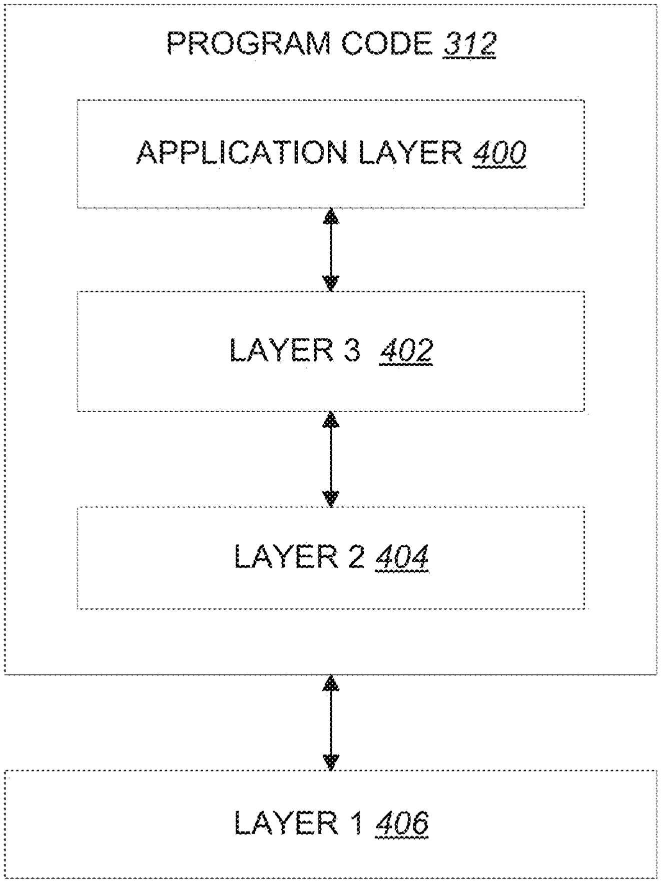
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-) bullets, points, actions, or claims described in each invention paragraph or section may be combined logically, reasonably, and properly to form a specific method.

Any sentence, paragraph, (sub-) bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In 38.321 ([1] 3GPP TS 38.321 v18.3.0), random access procedure, time alignment, configured uplink grant, MAC reset, and L1/L2-triggered mobility (LTM) procedure are introduced:

5.1 Random Access Procedure 5.1.1 Random Access Procedure Initialization

The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell or an LTM candidate cell shall only be initiated by a PDCCH order with ra-PreambleIndex different from 0b000000.

When the Random Access procedure is initiated on a Serving Cell or for an LTM candidate cell, the MAC entity shall:

1> flush the Msg3 buffer;

1> flush the MSGA buffer;

1> set the PREAMBLE_TRANSMISSION_COUNTER to 1;

1> if the Random Access procedure is initiated on a Serving Cell; or

1> if the Random Access procedure is initiated by the PDCCH order for an LTM candidate cell and the PDCCH order indicates preamble initial transmission; or 1> if the Random Access procedure is initiated by the PDCCH order for an LTM candidate cell, which is different from the cell to which the UE performed the last Random Access Preamble transmission, and the PDCCH order indicates preamble re-transmission:

2> set the PREAMBLE_POWER_RAMPING_COUNTER to 1;

1> set the PREAMBLE_BACKOFF to 0 ms;

1> set POWER_OFFSET_2STEP_RA to 0 dB;

1> perform the BWP operation as specified in clause 5.15, except when the Random Access procedure is initiated by the PDCCH order for an LTM candidate cell;

1> select the set of Random Access resources applicable to the current Random Access procedure according to clause 5.1.1b;

1> if the Random Access procedure is initiated by PDCCH order and if the ra-PreambleIndex explicitly provided by PDCCH is not 0b000000; or 1> if the Random Access procedure was initiated for SI request (as specified in TS 38.331 [5]) and the Random Access Resources for SI request have been explicitly provided by RRC; or 1> if the Random Access procedure was initiated for SpCell beam failure recovery (as specified in clause 5.17) and if the contention-free Random Access Resources for beam failure recovery request for 4-step RA type have been explicitly provided by RRC for the BWP selected for Random Access procedure; or 1> if the Random Access procedure was initiated for reconfiguration with sync and if the contention-free Random Access Resources for 4-step RA type have been explicitly provided in rach-ConfigDedicated for the BWP selected for Random Access procedure; or 1> if the Random Access procedure was initiated for LTM cell switch and if the contention-free Random Access Resources have been explicitly provided in LTM Cell Switch Command MAC CE:

2> set the RA_TYPE to 4-stepRA.

1> else if the BWP selected for Random Access procedure is configured with both 2-step and 4-step RA type Random Access Resources within the selected set of Random Access resources (as specified in clause 5.1.1b) and the RSRP of the downlink pathloss reference is above msgA-RSRP-Threshold; or 1> if the BWP selected for Random Access procedure is only configured with 2-step RA type Random Access resources within the selected set of Random Access resources according to clause 5.1.1b; or 1> if the Random Access procedure was initiated for reconfiguration with sync and if the contention-free Random Access Resources for 2-step RA type have been explicitly provided in rach-ConfigDedicated for the BWP selected for Random Access procedure:

2> set the RA_TYPE to 2-stepRA.

1> else:

2> set the RA_TYPE to 4-stepRA.

1> perform initialization of variables specific to Random Access type as specified in clause 5.1.1a;

1> if RA_TYPE is set to 2-stepRA:

2> perform the Random Access Resource selection procedure for 2-step RA type (see clause 5.1.2a).

1> else:

2> perform the Random Access Resource selection procedure (see clause 5.1.2).

5.1.2 Random Access Resource Selection

If the selected RA_TYPE is set to 4-stepRA, the MAC entity shall:

1> else if the ra-PreambleIndex has been explicitly provided by PDCCH; and

1> if the ra-PreambleIndex is not 0b000000:

2> set the PREAMBLE_INDEX to the signalled ra-PreambleIndex;

2> select the SSB signalled by PDCCH.

1> else if contention-free Random Access Resources have been explicitly provided by an LTM Cell Switch Command MAC CE and the SS-RSRP of the SSB signalled by the LTM Cell Switch Command MAC CE is above rsrp-ThresholdSSB:

2> set the PREAMBLE_INDEX to the Random Access Preamble index signalled by the LTM Cell Switch Command MAC CE;

2> select the SSB signalled by the LTM Cell Switch Command MAC CE.

1> else if contention-free Random Access Resources have not been explicitly provided by an LTM Cell Switch Command MAC CE, the Random Access procedure was not initiated for recovery using an LTM candidate configuration as specified in TS 38.331 [5] clause 5.3.7.3, contention-free Random Access Resources associated with SSBs have been explicitly provided in rach-ConfigDedicated and at least one SSB with SS-RSRP above rsrp-ThresholdSSB amongst the associated SSBs is available:

2> select an SSB with SS-RSRP above rsrp-ThresholdSSB amongst the associated SSBs;

2> set the PREAMBLE_INDEX to a ra-PreambleIndex corresponding to the selected SSB.

1> else if contention-free Random Access Resources have not been explicitly provided by an LTM Cell Switch Command MAC CE, the Random Access procedure was not initiated for recovery using an LTM candidate configuration as specified in TS 38.331 [5] clause 5.3.7.3, contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:

2> select a CSI-RS with CSI-RSRP above rsrp-ThresholdCSI-RS amongst the associated CSI-RSs;

2> set the PREAMBLE_INDEX to a ra-PreambleIndex corresponding to the selected CSI-RS.

1> else if the Random Access procedure was initiated for SI request (as specified in TS 38.331 [5]); and 1> if the Random Access Resources for SI request have been explicitly provided by RRC:

2> if at least one of the SSBs with SS-RSRP above rsrp-ThresholdSSB is available:

3> select an SSB with SS-RSRP above rsrp-ThresholdSSB.

2> else:

3> select any SSB.

2> select a Random Access Preamble corresponding to the selected SSB, from the Random Access Preamble(s) determined according to ra-PreambleStartIndex as specified in TS 38.331 [5];

2> set the PREAMBLE_INDEX to selected Random Access Preamble.

1> else (i.e. for the contention-based Random Access preamble selection):

2> if at least one of the SSBs with SS-RSRP above rsrp-ThresholdSSB is available:

3> select an SSB with SS-RSRP above rsrp-ThresholdSSB.

2> else:

3> select any SSB.

. . .

2> select a Random Access Preamble randomly with equal probability from the Random Access Preambles associated with the selected SSB and the selected Random Access Preambles group;

2> set the PREAMBLE_INDEX to the selected Random Access Preamble.

. . .

1> else if an SSB is selected above:

2> if the set of Random Access resources associated with Msg1 repetition is selected for this Random Access procedure:

3> determine the next available set of PRACH occasions (as specified in TS 38.213 [6]) for the Msg1 repetition number applicable for this Random Access procedure corresponding to the selected SSB (the MAC entity shall select a set of PRACH occasions randomly with equal probability amongst sets of PRACH occasions according to clause 8.1 of TS 38.213 [6] regardless the FR2 UL gap, corresponding to the selected SSB and selected Msg1 repetition number for this Random Access procedure; the MAC entity may take into account the possible occurrence of measurement gaps and MUSIM gaps when determining the next available set of PRACH occasions corresponding to the selected SSB).

2> else:

3> determine the next available PRACH occasion from the PRACH occasions corresponding to the selected SSB permitted by the restrictions given by the ra-ssb-OccasionMaskIndex if configured, or ssb-SharedRO-MaskIndex if configured, or indicated by PDCCH, or indicated by the LTM Cell Switch Command MAC CE (the MAC entity shall select a PRACH occasion randomly with equal probability amongst the consecutive PRACH occasions according to clause 8.1 of TS 38.213 [6] regardless the FR2 UL gap, corresponding to the selected SSB; the MAC entity may take into account the possible occurrence of measurement gaps and MUSIM gaps when determining the next available PRACH occasion corresponding to the selected SSB).

1> else if a CSI-RS is selected above:

2> if there is no contention-free Random Access Resource associated with the selected CSI-RS:

3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to clause 8.1 of TS 38.213 [6] regardless the FR2 UL gap, corresponding to the SSB which is quasi-colocated with the selected CSI-RS; the MAC entity may take into account the possible occurrence of measurement gaps and MUSIM gaps when determining the next available PRACH occasion corresponding to the SSB which is quasi-colocated with the selected CSI-RS).

2> else:

3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers regardless the FR2 UL gap, corresponding to the selected CSI-RS; the MAC entity may take into account the possible occurrence of measurement gaps and MUSIM gaps when determining the next available PRACH occasion corresponding to the selected CSI-RS).

1> perform the Random Access Preamble transmission procedure (see clause 5.1.3).

. . .

5.1.3 Random Access Preamble Transmission

The MAC entity shall, for each Random Access Preamble:

1> if PREAMBLE_TRANSMISSION_COUNTER is greater than one; and

1> if the notification of suspending power ramping counter has not been received from lower layers; and 1> if LBT failure indication was not received from lower layers for the last Random Access Preamble transmission; and 1> if SSB or CSI-RS selected is not changed from the selection in the last Random Access Preamble transmission; and 1> if the Random Access procedure is not initiated by the PDCCH order for an LTM candidate cell:

2> increment PREAMBLE_POWER_RAMPING_COUNTER by 1.

1> if the Random Access procedure is initiated by the PDCCH order for an LTM candidate cell as preamble re-transmission; and 1> if the PDCCH order indicates the same LTM candidate cell and the same SSB as the last Random Access Preamble transmission:

2> increment PREAMBLE_POWER_RAMPING_COUNTER by 1.

1> select the value of DELTA_PREAMBLE according to clause 7.3;

1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA;

1> except for contention-free Random Access Preamble for beam failure recovery request and contention-free Random Access Preamble triggered by a PDCCH order for an LTM candidate cell, compute the RA-RNTI associated with the PRACH occasion in which the Random Access Preamble is transmitted;

1> instruct the physical layer to transmit the Random Access Preamble using the selected PRACH occasion, corresponding RA-RNTI (if available), PREAMBLE_INDEX, and PREAMBLE_RECEIVED_TARGET_POWER.

1> if the Random Access Procedure is triggered by a PDCCH order for an LTM candidate cell:

2> consider this Random Access procedure completed.

. . .

5.2 Maintenance of Uplink Time Alignment

RRC configures the following parameters for the maintenance of UL time alignment:

timeAlignmentTimer (per TAG) which controls how long the MAC entity considers the Serving Cells to the associated TAG to be uplink time aligned for the TAG;

inactivePosSRS-TimeAlignmentTimer which controls how long the MAC entity considers the Positioning SRS transmission in RRC_INACTIVE in clause 5.26 to be uplink time aligned;

cg-SDT-TimeAlignmentTimer which controls how long the MAC entity considers the uplink transmission for CG-SDT to be uplink time aligned;

inactivePosSRS-ValidityAreaTAT which controls how long the MAC entity considers Positioning SRS transmission in RRC_INACTIVE in clause 5.26 to be uplink time aligned when SRS positioning validity area is configured.

The MAC entity shall:

1> when a Timing Advance Command MAC CE is received, and if an NTA (as defined in TS 38.211 [8]) has been maintained with the indicated TAG:

2> apply the Timing Advance Command for the indicated TAG;

2> if there is ongoing Positioning SRS Transmission in RRC_INACTIVE as in clause 5.26:

3> if SRS positioning validity area is configured:

4> start or restart the inactivePosSRS-ValidityAreaTAT associated with the indicated TAG.

3> else:

4> start or restart the inactivePosSRS-TimeAlignmentTimer associated with the indicated TAG.

2> if CG-SDT procedure triggered as in clause 5.27 is ongoing:

3> start or restart the cg-SDT-TimeAlignmentTimer associated with the indicated TAG.

2> else:

3> start or restart the timeAlignmentTimer associated with the indicated TAG.

1> when a Timing Advance Command is received in a Random Access Response message for a Serving Cell configured with two TAGs or in a MSGB for an SpCell configured with two TAGS:

2> if the Random Access Preamble was not selected by the MAC entity among the contention-based Random Access Preamble:

3> apply the Timing Advance Command for the TAG indicated in the received Random Access Response message or MSGB;

3> start or restart the timeAlignmentTimer associated with TAG indicated in the received Random Access Response message or MSGB.

2> else if the timeAlignmentTimer associated with the TAG indicated in the received Random Access Response message or MSGB is not running:

3> apply the Timing Advance Command for this TAG;

3> start the timeAlignmentTimer associated with this TAG;

3> when the Contention Resolution is considered not successful as described in clause 5.1.5:

4> stop the timeAlignmentTimer associated with this TAG.

2> else:

3> ignore the received Timing Advance Command.

1> when a Timing Advance Command is received in a Random Access Response message for a Serving Cell not configured with two TAGs or in a MSGB for an SpCell not configured with two TAGS:

2> if the Random Access Preamble was not selected by the MAC entity among the contention-based Random Access Preamble:

3> apply the Timing Advance Command for this TAG;

3> start or restart the timeAlignmentTimer associated with this TAG.

2> else if the timeAlignmentTimer associated with this TAG is not running:

3> apply the Timing Advance Command for this TAG;

3> start the timeAlignmentTimer associated with this TAG;

3> when the Contention Resolution is considered not successful as described in clause 5.1.5; or 3> when the Contention Resolution is considered successful for SI request as described in clause 5.1.5, after transmitting HARQ feedback for MAC PDU including UE Contention Resolution Identity MAC CE:

4> stop timeAlignmentTimer associated with this TAG.

3> when the Contention Resolution is considered not successful as described in clause 5.1.5:

4> if CG-SDT procedure triggered as in clause 5.27 is ongoing:

5> set the $N_{TA}$ value to the value before applying the received Timing Advance Command as in TS 38.211 [8].

3> when the Contention Resolution is considered successful for Random Access procedure while the CG-SDT procedure is ongoing:

4> stop timeAlignmentTimer associated with this TAG;

4> start or restart the cg-SDT-TimeAlignmentTimer associated with this TAG.

3> when the Contention Resolution is considered successful for Random Access procedure while SRS transmission in RRC_INACTIVE is ongoing:

4> if SRS positioning validity area is configured:

5> start or restart the inactivePosSRS-ValidityAreaTAT associated with the indicated TAG.

4> else:

5> start or restart the inactivePosSRS-TimeAlignmentTimer associated with this TAG.

2> else:

3> ignore the received Timing Advance Command.

1> when an Absolute Timing Advance Command is received in response to a MSGA transmission including C-RNTI MAC CE, as specified in clause 5.1.4a, for an SpCell configured with two TAGS:

2> apply the Timing Advance Command for the PTAG indicated in the Absolute Timing Advance Command MAC CE;

2> start or restart the timeAlignmentTimer associated with this PTAG.

1> when an Absolute Timing Advance Command is received in response to a MSGA transmission including C-RNTI MAC CE, as specified in clause 5.1.4a, for an SpCell not configured with two TAGS:

2> apply the Timing Advance Command for PTAG;

2> if there is ongoing Positioning SRS Transmission in RRC_INACTIVE as in clause 5.26:

3> if SRS positioning validity area is configured:

4> start or restart the inactivePosSRS-ValidityAreaTAT associated with the indicated TAG.

3> else:

4> start or restart the inactivePosSRS-TimeAlignmentTimer associated with the indicated TAG.

2> if CG-SDT procedure is ongoing:

3> start or restart the cg-SDT-TimeAlignmentTimer associated with PTAG.

2> else:

3> start or restart the timeAlignmentTimer associated with PTAG.

1> when the MAC entity is configured with rach-LessHO:

2> set the $N_{TA}$ value (as defined in TS 38.211 [8]) to the value indicated by targetNTA in rach-LessHO for PTAG;

2> start the timeAlignmentTimer associated with PTAG.

. . .

1> when instruction from the upper layer has been received for starting the TimeAlignmentTimer associated with PTAG:

2> start the TimeAlignmentTimer associated with the indicated PTAG.

1> when an LTM Cell Switch Command MAC CE is received and the Timing Advance Command is not set as FFF:

2> apply the Timing Advance Command for the PTAG as specified in clause 6.1.3.75;

2> start or restart the timeAlignmentTimer associated with the PTAG as specified in clause 6.1.3.75.

1> when an LTM Cell Switch Command MAC CE is received, and the Timing Advance Command is set as FFF, and the UE has successfully measured the Timing Advance as in clause 5.18.35:

2> apply the measured Timing Advance for the PTAG;

2> start or restart the timeAlignmentTimer associated with the PTAG.

1> when a timeAlignmentTimer expires:

2> if the timeAlignmentTimer is associated with a PTAG and the SpCell is not configured with two PTAGs; or 2> if the timeAlignmentTimer is associated with a PTAG, the SpCell is configured with two PTAGs, and the timeAlignmentTimer associated with the other PTAG is not running:

3> flush all HARQ buffers for all Serving Cells;

3> notify RRC to release PUCCH for all Serving Cells, if configured;

3> notify RRC to release SRS for all Serving Cells, if configured;

3> clear any configured downlink assignments and configured uplink grants;

3> clear any PUSCH resource for semi-persistent CSI reporting;

3> consider all running timeAlignmentTimers as expired;

3> maintain $N_{TA}$ (defined in TS 38.211 [8]) of all TAGs.

2> else:

3> if the timeAlignmentTimer is associated with a TAG for an SCell configured with only this TAG; or 3> if the timeAlignmentTimer is associated with a TAG for an SCell, and if the SCell is configured with two TAGs and the timeAlignmentTimer associated with the other TAG is not running:

4> flush all HARQ buffers for all such SCells;

4> notify RRC to release PUCCH, if configured for all such SCells;

4> notify RRC to release SRS, if configured for all such SCells;

4> clear any configured downlink assignments and configured uplink grants for all such SCells;

4> clear any PUSCH resource for semi-persistent CSI reporting for all such SCells;

4> maintain $N_{TA}$ (defined in TS 38.211 [8]) of this TAG.

3> else if the timeAlignmentTimer is associated with a TAG for a Serving Cell configured with two TAGs, and if the timeAlignmentTimer associated with the other TAG is running, for all such Serving Cells:

4> clear any configured downlink assignment, if the activated TCI state(s) for all PUCCH resources configured for the configured downlink assignment is associated with the TAG of the expired timeAlignmentTimer;

4> clear any configured uplink grant, if the activated TCI state(s) for the configured uplink grant is associated with the TAG of the expired timeAlignmentTimer;

4> clear any PUSCH resource for semi-persistent CSI reporting, if the activated TCI state(s) for the PUSCH resource is associated with the TAG of the expired timeAlignmentTimer;

4> maintain $N_{TA}$ (defined in TS 38.211 [8]) of this TAG.

. . .

. . .

The MAC entity shall not perform any uplink transmission on a Serving Cell except the Random Access Preamble and MSGA transmission when the timeAlignmentTimer(s) associated with all TAG(s) to which this Serving Cell belongs is not running, CG-SDT procedure is not ongoing and SRS transmission in RRC_INACTIVE as in clause 5.26 is not ongoing. Furthermore, when the timeAlignmentTimer(s) associated with all PTAG(s) is not running, CG-SDT procedure is not ongoing and SRS transmission in RRC_INACTIVE as in clause 5.26 is not ongoing, the MAC entity shall not perform any uplink transmission on any Serving Cell except the Random Access Preamble and MSGA transmission on the SpCell. The MAC entity shall not perform any uplink transmission except the Random Access Preamble and MSGA transmission when the cg-SDT-TimeAlignmentTimer is not running during the ongoing CG-SDT procedure as triggered in clause 5.27 and the inactivePosSRS-TimeAlignmentTimer or inactivePosSRS-ValidityAreaTAT is not running. The MAC entity shall not perform any uplink transmission except the Random Access Preamble and MSGA transmission on a Serving Cell using TCI state(s) associated with a TAG for which the timeAlignmentTimer is not running.

5.8 Transmission and Reception without Dynamic Scheduling

. . .

5.8.2 Uplink

There are two types of transmission without dynamic grant:

configured grant Type 1 where an uplink grant is provided by RRC, and stored as configured uplink grant;

configured grant Type 2 where an uplink grant is provided by PDCCH, and stored or cleared as configured uplink grant based on L1 signalling indicating configured uplink grant activation or deactivation.

Type 1 and Type 2 are configured by RRC for a Serving Cell per BWP. Multiple configurations can be active simultaneously in the same BWP. For Type 2, activation and deactivation are independent among the Serving Cells. For the same BWP, the MAC entity can be configured with both Type 1 and Type 2.

A multi-PUSCH configured grant has multiple consecutive configured uplink grants within a periodicity. Both Type 1 and Type 2 can be configured for a multi-PUSCH configured grant by RRC.

Only configured grant Type 1 can be configured for CG-SDT or for RACH-less LTM cell switch or for RACH-less handover. CG-SDT can only be configured on initial BWP.

RRC configures the following parameters when the configured grant Type 1 is configured:

cs-RNTI: CS-RNTI for retransmission;

cg-SDT-CS-RNTI: CS-RNTI for CG-SDT retransmission;

cg-SDT-RSRP-ThresholdSSB: an RSRP threshold configured for SSB selection for CG-SDT;

cg-RRC-RSRP-ThresholdSSB: an RSRP threshold configured for SSB selection for RACH-less handover;

periodicity: periodicity of the configured grant Type 1;

timeDomainOffset: Offset of a resource with respect to SFN=timeReferenceSFN in time domain;

timeDomainAllocation: Allocation of configured uplink grant in time domain which contains startSymbolAndLength (i.e. SLIV in TS 38.214 [7]) or startSymbol (i.e. S in TS 38.214 [7]);

nrofHARQ-Processes: the number of HARQ processes for configured grant;

- harq-ProcID-Offset: offset of HARQ process for configured grant configured with cg-RetransmissionTimer for operation with shared spectrum channel access;
- harq-ProcID-Offset2: offset of HARQ process for configured grant not configured with cg-RetransmissionTimer;
- timeReferenceSFN: SFN used for determination of the offset of a resource in time domain. The UE uses the closest SFN with the indicated number preceding the reception of the configured grant configuration;
- timeReferenceH-SFN: H-SFN used for determination of the offset of a resource in time domain. The UE uses the closest H-SFN with the indicated number preceding the reception of the configured grant configuration.

RRC configures the following parameters when the configured grant Type 2 is configured:

- cs-RNTI: CS-RNTI for activation, deactivation, and retransmission;
- periodicity: periodicity of the configured grant Type 2;
- nrofHARQ-Processes: the number of HARQ processes for configured grant;
- harq-ProcID-Offset: offset of HARQ process for configured grant configured with cg-RetransmissionTimer for operation with shared spectrum channel access;
- harq-ProcID-Offset2: offset of HARQ process for configured grant not configured with cg-RetransmissionTimer.

RRC configures the following parameter when retransmissions on configured uplink grant is configured:

- cg-RetransmissionTimer: the duration after a configured grant (re) transmission of a HARQ process when the UE shall not autonomously retransmit that HARQ process;
- cg-SDT-RetransmissionTimer: the duration after a configured grant (re) transmission of a HARQ process of the initial CG-SDT transmission with CCCH message when the UE shall not autonomously retransmit the HARQ process;
- cg-RRC-RetransmissionTimer: the duration after a configured grant (re) transmission of a HARQ process of the initial transmission of RACH-less handover and RACH-less LTM cell switch when the UE shall not autonomously retransmit the HARQ process.

. . .

For a configured uplink grant, the MAC entity shall:

1> if its associated configured grant is configured with UTO-UCI and it has not been indicated to the lower layers as unused for PUSCH transmission; or 1> if its associated configured grant is not configured with UTO-UCI:

2> if it is associated with a multi-PUSCH configured grant and meets the validity conditions specified in the clause 6.1 in TS 38.214 [7]; or 2> if it is not associated with a multi-PUSCH configured grant:

3> consider it available for use.

The MAC entity shall not include the UL-SCH resource of a configured uplink grant not available for use in its procedures (e.g. in clause 5.4.4).

For a configured grant configured with UTO-UCI, the MAC entity determines if a configured uplink grant which is within the subsequent nrofBitsInUTO-UCI valid occasions of its associated configured grant configuration is going to be used for PUSCH transmission by considering at least the amount of buffered data that can be transmitted on the available occasions of the associated configured grant and other available UL-SCH resources. Upon this determination, the MAC entity sends an indication to lower layers, for use in the procedure for reporting UTO-UCI.

Upon configuration of a configured grant Type 1 for a BWP of a Serving Cell by upper layers, the MAC entity shall:

1> store the uplink grant provided by upper layers as a configured uplink grant for the indicated BWP of the Serving Cell;

1> initialise or re-initialise the configured uplink grant to start in the symbol according to timeDomainOffset, timeReferenceSFN, and S (derived from SLIV or provided by startSymbol as specified in TS 38.214 [7]), and to reoccur with periodicity.

If cg-SDT-PeriodicityExt (as defined in TS 38.331 [5]) is not configured, after an uplink grant is configured for a configured grant Type 1, the MAC entity shall consider sequentially that the configured uplink grant, or the first configured uplink grant in a multi-PUSCH configured grant, in the $N^{th}$ ($N \geq 0$) periodicity occurs in the symbol for which:

$$[(SFN \times \text{numberOfSlotsPerFrame} \times \text{numberOfSymbolsPerSlot}) + (\text{slot number in the frame} \times \text{numberOfSymbolsPerSlot}) + \text{symbol number in the slot}] = (timeReferenceSFN \times \text{numberOfSlotsPerFrame} \times \text{numberOfSymbolsPerSlot} + \text{timeDomainOffset} \times \text{numberOfSymbolsPerSlot} + S + N \times \text{periodicity}) \text{ modulo}(1024 \times \text{numberOfSlotsPerFrame} \times \text{numberOfSymbolsPerSlot})$$

If cg-SDT-PeriodicityExt (as defined in TS 38.331 [5]) is configured, after an uplink grant is configured for a configured grant Type 1, the MAC entity shall consider sequentially that the configured uplink grant, or the first configured uplink grant in a multi-PUSCH configured grant, in the $N^{th}$ ($N \geq 0$) periodicity occurs in the symbol for which:

$$\left[\left(H{-}SFN \times numberOfSFNperH{-}SFN + SFN\right) \times numberOfSlotsPerFrame \times numberOfSymbolsPerSlot + (\text{slot number in the frame} \times numberOfSymbolsPerSlot) + \text{symbol number in the slot}\right] = \left(\left(timeReferenceH{-}SFN \times numberOfSFNperH{-}SFN + timeReferenceSFN\right) \times numberOfSlotsPerFrame \times numberOfSymbolsPerSlot + timeDomainOffset \times numberOfSymbolsPerSlot + S + N \times \text{periodicity}\right) \text{ modulo } (1024 \times 1024 \times numberOfSlotsPerFrame \times numberOfSymbolsPerSlot)$$

. . .

For an uplink grant configured for configured grant Type 1 for RACH-less LTM cell switch, when there is an ongoing RACH-less LTM cell switch procedure, for each configured uplink grant valid according to TS 38.214 [7] for which the above formula is satisfied, the MAC entity shall:

1> if an SSB corresponding to the configured UL grant has the same SSB index as the SSB associated with the TCI state indicated by the TCI state ID field in LTM Cell Switch Command MAC CE, as specified in clause 5.18.35:

2> select the SSB associated with the TCI state indicated by LTM Cell Switch Command MAC CE.

2> indicate the SSB index to the lower layer;

2> consider this configured uplink grant as valid.

1> else:

2> consider this configured uplink grant as not valid.

NOTE 1a: When there is an ongoing RACH-less LTM cell switch, the configured grant Type 1 which is not specifically configured for LTM (see cg-LTM-Configuration in TS 38.331 [5]) is not used.

NOTE 1b: After completion of LTM cell switch, the UE stops using the grant configured for RACH-less LTM cell switch (see cg-LTM-Configuration in TS 38.331 [5]).

For the uplink grant configured for configured grant Type 1 for RACH-less handover, if the configured uplink grant is valid according to TS 38.214 [7] for which the above formula is satisfied, the MAC entity shall:

1> if, after the initial transmission of RACH-less handover has been performed according to clause 5.4.1 and 5.33, RACH-less handover is not successfully completed:

2> if the SSB corresponding to the configured UL grant has the same SSB index as the SSB selected for the initial transmission of RACH-less handover (i.e., retransmission of initial transmission of RACH-less handover):

3> select this SSB;

3> indicate the SSB index corresponding to the configured uplink grant to the lower layer, 3> consider this configured uplink grant as valid.

1> else if at least one SSB corresponding to the configured uplink grant with SS-RSRP above cg-RRC-RSRP-ThresholdSSB is available:

2> select an SSB with SS-RSRP above cg-RRC-RSRP-ThresholdSSB amongst the SSB(s) associated with the configured uplink grant;

2> indicate the selected SSB index to the lower layer;

2> consider this configured uplink grant as valid.

1> else:

2> consider this configured uplink grant as not valid;

2> initiate Random Access procedure in clause 5.1.

. . .

5.12 MAC Reset

If a reset of the MAC entity is requested by upper layers upon receiving RRCResume or RRCSetup, the MAC entity shall:

1> stop the MBS multicast DRX timers;

1> flush the soft buffers for all DL HARQ processes used for MBS multicast;

1> for each DL HARQ process used for MBS multicast, consider the next received transmission for a TB as the very first transmission.

Otherwise, if a reset of the MAC entity is requested by upper layers or the reset of the MAC entity is triggered due to SCG deactivation as defined in clause 5.29, the MAC entity shall:

1> if the MAC reset is not due to SCG deactivation:

2> initialize Bj for each logical channel to zero;

1> initialize SBj for each logical channel to zero if Sidelink resource allocation mode 1 is configured by RRC;

1> if upper layers indicate SCG deactivation and bfd-and-RLM with value true is configured for the deactivated SCG:

2> stop (if running) all timers except beamFailureDetectionTimer associated with PSCell and timeAlignmentTimers.

1> else:

2> stop (if running) all timers, except MBS broadcast DRX timers;

2> consider all timeAlignmentTimers, inactivePosSRS-TimeAlignmentTimer, and cg-SDT-TimeAlignmentTimer, if configured, as expired and perform the corresponding actions in clause 5.2;

1> set the NDIs for all uplink HARQ processes to the value 0;

1> sets the NDIs for all HARQ process IDs to the value 0 for monitoring PDCCH in Sidelink resource allocation mode 1;

1> stop, if any, ongoing Random Access procedure;

1> discard explicitly signalled contention-free Random Access Resources for 4-step RA type and 2-step RA type, if any;

1> flush Msg3 buffer;

1> flush MSGA buffer;

1> cancel, if any, triggered Scheduling Request procedure;

1> cancel, if any, triggered Buffer Status Reporting procedure;

1> cancel, if any, triggered Delay Status Reporting procedure;

1> cancel, if any, triggered Power Headroom Reporting procedure;

1> cancel, if any, triggered consistent LBT failure;

1> cancel, if any, triggered Sidelink consistent LBT failure;

1> cancel, if any, triggered BFR;

1> cancel, if any, triggered Sidelink Buffer Status Reporting procedure;

1> cancel, if any, triggered Pre-emptive Buffer Status Reporting procedure;

1> cancel, if any, triggered Timing Advance Reporting procedure;

1> cancel, if any, triggered Recommended bit rate query procedure;

1> cancel, if any, triggered Configured uplink grant confirmation;

1> cancel, if any, triggered configured sidelink grant confirmation;

1> clear, if any, configured sidelink grants;

1> cancel, if any, triggered Desired Guard Symbol query;

1> cancel, if any, triggered Positioning Measurement Gap Activation/Deactivation Request procedure;

1> cancel, if any, triggered SDT procedure;

1> cancel, if any, triggered IAB-MT Recommended Beam Indication query;

1> cancel, if any, triggered Desired DL TX Power Adjustment query;

1> cancel, if any, triggered Desired IAB-MT PSD range query;

1> cancel, if any, triggered Case-6 Timing Request query;

1> cancel, if any, triggered SL-PRS resource request;

1> flush the soft buffers for all DL HARQ processes, except for the DL HARQ process being used for MBS broadcast;

1> for each DL HARQ process, except for the DL HARQ process being used for MBS broadcast, consider the next received transmission for a TB as the very first transmission;

1> release, if any, Temporary C-RNTI;

1> clear, if any, Differential Koffset;

1> if upper layers indicate SCG deactivation and bfd-and-RLM with value true is not configured; or 1> if the MAC reset is not due to SCG deactivation:

2> reset all BFI COUNTERS;

1> reset all LBT COUNTERs.

. . .

. . .

5.18.35 LTM Cell Switch Command

The network may instruct the UE to perform LTM cell switch procedure by sending the LTM Cell Switch Command MAC CE described in clause 6.1.3.75.

The MAC entity shall:

1> if the MAC entity receives an LTM Cell Switch Command MAC CE on a Serving Cell:

2> indicate to upper layers that the LTM cell switch procedure is triggered and the Target Configuration ID included in the LTM Cell Switch Command MAC CE;

2> if the MAC reset operation as specified in clause 5.12 is performed, as requested by upper layers:

3> if Timing Advance Command value (hexa-decimal) is not set as FFF:

4> process the received Timing Advance Command (see clause 5.2);

4> consider the RACH-less LTM cell switch to be ongoing;

4> if the MAC entity is associated with SCG:

5> indicate to upper layers to skip the Random Access procedure for this LTM cell switch.

3> else if the UE is configured with UE-based Timing Advance measurement as specified in TS 38.331 [5] and the UE has successfully measured the Timing Advance for the SpCell of the indicated LTM target configuration:

4> process the measured Timing Advance (see clause 5.2);

4> consider the RACH-less LTM cell switch to be ongoing.

4> if the MAC entity is associated with SCG:

5> indicate to upper layers to skip the Random Access procedure for this LTM cell switch.

3> consider the SSB associated to the TCI state indicated by TCI state ID field as the one used for configured uplink grant selection for the initial uplink transmission towards the candidate cell for RACH-less LTM cell switch (as in clause 5.8.2);

3> indicate to lower layers the information regarding the TCI state information included in the LTM Cell Switch Command MAC CE.

. . .

6.1.3.75 LTM Cell Switch Command MAC CE

The LTM Cell Switch Command MAC CE is identified by MAC subheader with eLCID as specified in Table 6.2.1-1b. It has a variable size with following fields (FIG. 6.1.3.75-1):

R: Reserved bit, set to 0;

Target Configuration ID: This field indicates the index of candidate target configuration to apply for LTM cell switch, corresponding to Itm-CandidateId minus 1 as specified in TS 38.331 [5]. The length of the field is 3 bits;

Timing Advance Command: This field indicates whether the TA is valid for the LTM target cell (i.e. the SpCell corresponding to the target configuration indicated by Target Configuration ID field). If the value of this field is set to FFF, this field indicates that no valid timing adjustment is available for the PTAG of the LTM target cell; otherwise, this field indicates the index value $T_A$ used to control the amount of timing adjustment that the MAC entity has to apply in TS 38.213 [6], and that the UE can skip the Random Access procedure for this LTM cell switch. If tag-Id-ptr is configured for the TCI state indicated by the UL TCI state ID field, if present, or by the TCI state ID field otherwise, in the LTM target cell and tag-Id-ptr is set to value n1, this field indicates the TA for the TAG indicated by the tag2-Id of the LTM target cell; otherwise, this field indicates the TA for the TAG indicated by the tag-id of the LTM target cell. The length of the field is 12 bits;

TCI state ID: This field indicates and activates the TCI state for the LTM target cell (i.e. the SpCell of the target configuration indicated by the Target Configuration ID field). The TCI state is identified by TCI-StateId in Itm-DL-OrJointTCI-StateToAddModList as specified in TS 38.331 [5]. If the value of unifiedTCI-StateType in the ltm-TCI-Info of the configuration indicated by Target Configuration ID field is joint, this field is for joint TCI state, otherwise, this field is for downlink TCI state. The length of the field is 7 bits;

UL TCI state ID: This field indicates and activates the uplink TCI state for the LTM target cell (i.e. the SpCell of the target configuration indicated by the Target Configuration ID field). The UL TCI state is identified by TCI-UL-StateId in Itm-UL-TCI-StateToAddModList as specified in TS 38.331 [5]. The octet containing this field (i.e. this field and the two reserved bits in the same octet) is included if the value of unifiedTCI-StateType in the ltm-TCI-Info of the configuration indicated by Target Configuration ID field is separate. The length of the field is 6 bits;

C: This field indicates the presence of the contention-free Random Access Resources fields. If the value of this field is set to 1, the following fields are present: Random Access Preamble index field, S/U field, SS/PBCH index field, PRACH Mask index field, Repetition number field and the reserved bits in the same octet. If the value of this field is set to 0, these fields are absent.

S/U: This field indicates which UL carrier to transmit the PRACH of the contention-free Random Access Resources. If the value of this field is set to 1, SUL is used; otherwise, NUL is used. The length of the field is 1 bit;

Random Access Preamble index: This field indicates the Random Access Preamble index of the contention-free Random Access Resources. This field should not be set to 0b000000. The length of the field is 6 bits;

SS/PBCH index: This field indicates the SS/PBCH that shall be used to determine the RACH occasion for the PRACH transmission of the contention-free Random Access Resources. The length of the field is 6 bits;

PRACH Mask index: This field indicates the RACH occasion(s) associated with the SS/PBCH indicated by 'SS/PBCH index' for the PRACH transmission of the contention-free Random Access Resources. It indicates a subset of RACH occasion(s) from the rach-ConfigDedicated for the UL carrier (indicated by S/U field), (if provided, otherwise it indicates a subset of RACH occasion(s) from the rach-ConfigCommon for the UL carrier (indicated by S/U field) in the UL BWP configuration of firstActiveUplinkBWP-Id as specified in TS 38.331 [5]. When the repetition number field is not set to 0, the UE ignores this field. The length of the field is 4 bits;

Repetition number: This field indicates the Msg1 repetition number to be applied to the contention-free Random Access. If this field is set to 0, Msg1 repetition number does not apply. If this field is set to 1, the Msg1 repetition number is 2. If this field is set to 2, the Msg1 repetition number is 4. If this field is set to 3, the Msg1 repetition number is 8. The length of the field is 2 bits.

. . .

Figure 6:
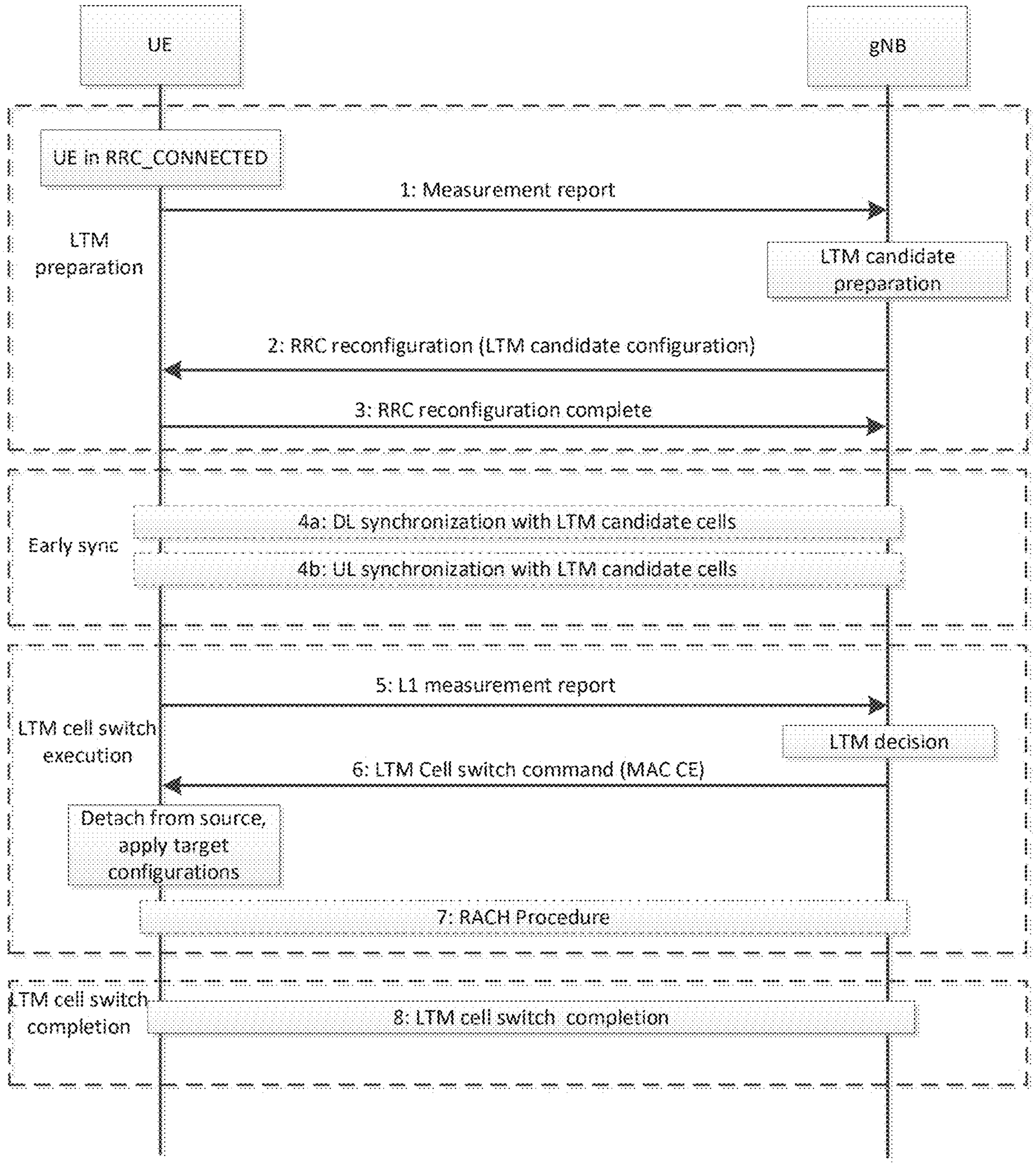
FIG. 6 (PRIOR ART)
FIG. 6 is a reproduction of FIG. 9.2.3.5.2-1. Signalling procedure for LTM, from 3GPP TS 38.300 v18.3.0.

FIG. 5 is a reproduction of FIG. 6.1.3.75-1: LTM Cell Switch Command MAC CE, from 3GPP TS 38.321 v18.3.0.

. . .

In 38.331 ([2] 3GPP TS 38.331 v18.3.0), conditional reconfiguration and measurement triggering event and LTM configuration are introduced:

5.3.5.5.2 Reconfiguration with Sync

The UE shall perform the following actions to execute a reconfiguration with sync.

1> if the AS security is not activated, perform the actions upon going to RRC_IDLE as specified in 5.3.11 with the release cause 'other' upon which the procedure ends;

1> stop timer T430 if running;

1> if no DAPS bearer is configured:

2> stop timer T310 for the corresponding SpCell, if running;

1> if this procedure is executed for the MCG:

2> if timer T316 is running;

3> stop timer T316;

3> if the UE supports RLF-Report for fast MCG recovery procedure as specified in TS 38.306 [26]:

4> set the elapsedTimeT316 in the VarRLF-Report to the value of the elapsed time of the timer T316;

4> set the pSCellId in the VarRLF-Report to the global cell identity of the PSCell, if available, otherwise to the physical cell identity and carrier frequency of the PSCell;

3> else:

4> clear the information included in VarRLF-Report, if any;

2> resume MCG transmission, if suspended.

1> stop timer T312 for the corresponding SpCell, if running;

. . .

1> else (sl-PathSwitchConfig is not included):

2> if this procedure is executed for the MCG or if this procedure is executed for an SCG not indicated as deactivated in the E-UTRA or NR RRC message in which the RRCReconfiguration message is embedded:

3> start timer T304 for the corresponding SpCell with the timer value set to t304, as included in the reconfigurationWithSync;

2> if the frequencyInfoDL is included:

3> consider the target SpCell to be one on the SSB frequency indicated by the frequencyInfoDL with a physical cell identity indicated by the physCellId;

2> else:

3> consider the target SpCell to be one on the SSB frequency of the source SpCell with a physical cell identity indicated by the physCellId;

2> if this procedure is performed due to an LTM cell switch execution:

3> start synchronising to the DL of the indicated LTM candidate cell, if no DL synchronization for the indicated LTM candidate cell has been already acquired;

2> else:

3> start synchronising to the DL of the target SpCell;

2> apply the specified BCCH configuration defined in 9.1.1.1 for the target SpCell;

2> acquire the MIB of the target SpCell, which is scheduled as specified in TS 38.213 [13];

2> if NTN-Config is configured for the target cell:

3> start timer T430 with the timer value set to ntn-UlSyncValidityDuration from the subframe indicated by epochTime, according to the target cell NTN-Config;

. . .

2> If any DAPS bearer is configured:

. . .

2> else:

3> reset the MAC entity of this cell group;

3> consider the SCell(s) of this cell group, if configured, that are not included in the SCellToAddModList in the RRCReconfiguration message, to be in deactivated state;

3> apply the value of the new UE-Identity as the C-RNTI for this cell group;

3> configure lower layers in accordance with the received spCellConfigCommon;

3> if rach-LessHO is included:

4> configure lower layers in accordance with rach-LessHO for the target SpCell;

3> configure lower layers in accordance with any additional fields, not covered in the previous, if included in the received reconfiguration WithSync.

5.3.5.13.4 Conditional Reconfiguration Evaluation

The UE shall:

1> for each condReconfigId within the VarConditionalReconfig:

2> if the RRCReconfiguration within condRRCReconfig includes the masterCellGroup including the reconfigurationWithSync:

3> if the associated condExecutionCondPSCell is configured:

4> consider the cell which has a physical cell identity matching the value indicated in the ServingCellConfigCommon included in the reconfigurationWithSync within the masterCellGroup in the received condRRCReconfig to be applicable cell; and 4> consider the cell which has a physical cell identity matching the value indicated in the ServingCellConfigCommon included in the reconfigurationWithSync within the secondaryCellGroup within the nr-SCG within the received condRRCReconfig to be applicable cell;

3> else:

4> consider the cell which has a physical cell identity matching the value indicated in the ServingCellConfigCommon included in the reconfigurationWithSync within the masterCellGroup in the received condRRCReconfig to be applicable cell;

2> else if the RRCReconfiguration within condRRCReconfig includes the secondaryCellGroup including the reconfigurationWithSync:

3> if the cell which has a physical cell identity matching the value indicated in the ServingCellConfigCommon included in the reconfigurationWithSync within the secondaryCellGroup within the received condRRCReconfig is not the PSCell:

4> if subsequentCondReconfig is not included for the condReconfigId; or

4> if subsequentCondReconfig is not included for the PSCell; or

4> if subsequentCondReconfig is included for the condReconfigId and there is a subsequentCondReconfig for the PSCell with a matching condReconfigId value in condExecutionCondToAddModList:

5> consider the cell to be applicable cell;

2> if condExecutionCondSCG is configured:

3> in the remainder of the procedure, consider each measId indicated in the condExecutionCondSCG as a measId in the VarMeasConfig associated with the SCG measConfig;

2> if the condExecutionCondPSCell is configured:

3> in the remainder of the procedure, consider each measId indicated in the condExecutionCondPSCell as a measId in the VarMeasConfig associated with the MCG measConfig;

2> if condExecutionCond is configured:

3> if it is configured via SRB3 or configured within nr-SCG or within nr-SecondaryCellGroupConfig (specified in TS 36.331 [10]) via SRB1:

4> in the remainder of the procedure, consider each measId indicated in the condExecutionCond as a measId in the VarMeasConfig associated with the SCG measConfig;

3> else:

4> in the remainder of the procedure, consider each measId indicated in the condExecutionCond as a measId in the VarMeasConfig associated with the MCG measConfig;

2> for each measId included in the measIdList within VarMeasConfig indicated in the condExecutionCond, condExecutionCondSCG, or condExecutionCondPSCell of the condReconfigId:

3> if condExecutionCond, condExecutionCondSCG, and subsequentCondReconfig are included for the condReconfigId:

4> ignore the measId(s) in the condExecutionCond of the condReconfigId;

3> if the condTriggerConfig is not configured with nesEvent:

4> if the condEventId is associated with condEventT1, and if the entry condition applicable for this event associated with the condReconfigId, i.e. the event corresponding with the condEventId(s) of the corresponding condTriggerConfig within VarConditionalReconfig, is fulfilled for the applicable cell; or 4> if the condEventId is associated with condEventD1 or condEventD2, and if the entry conditions applicable for this event associated with the condReconfigId, i.e. the event corresponding with the condEventId(s) of the corresponding condTriggerConfig within VarConditionalReconfig, is fulfilled for the applicable cell during the corresponding timeToTrigger defined for this event within the VarConditionalReconfig; or 4> if the condEventId is associated with condEventA3, condEventA4 or condEventA5, and if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

5> consider the event associated to that measId to be fulfilled;

4> if the measId for this event associated with the condReconfigId has been modified; or 4> if the condEventId is associated with condEventT1, and if the leaving condition applicable for this event associated with the condReconfigId, i.e. the event corresponding with the condEventId(s) of the corresponding condTriggerConfig within VarConditionalReconfig, is fulfilled for the applicable cell; or 4> if the condEventId is associated with condEventD1 or condEventD2, and if the leaving condition(s) applicable for this event associated with the condReconfigId, i.e. the event corresponding with the condEventId(s) of the corresponding condTriggerConfig within VarConditionalReconfig, is fulfilled for the applicable cell during the corresponding timeToTrigger defined for this event within the VarConditionalReconfig; or 4> if the condEventId is associated with condEventA3, condEventA4 or condEventA5, and if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

5> consider the event associated to that measId to be not fulfilled;

3> else:

4> if NES mode indication is received from lower layers, indicating that the NES-specific CHO execution condition of the PCell is enabled; and 4> if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

5> consider the event associated to that measId to be fulfilled;

4> if the measId for this event associated with the condReconfigId has been modified; or 4> if NES mode indication is received from lower layers, indicating that the NES-specific CHO execution condition of the PCell is disabled; or 4> if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

5> consider the event associated to that measId to be not fulfilled;

2> if condExecutionCondPSCell is not configured:

3> if event(s) associated to all measId(s) within condTriggerConfig for the applicable cell are fulfilled:

4> consider the applicable cell, associated to that condReconfigId, as a triggered cell;

4> initiate the conditional reconfiguration execution, as specified in 5.3.5.13.5;

2> else:

3> if event(s) associated to all measId(s), as indicated in the condExecutionCond and condExecutionCondPSCell, within condTriggerConfig for a target candidate cell within the stored condRRCReconfig are fulfilled:

4> consider the target candidate PCell within the stored condRRCReconfig, associated to that condReconfigId, as a triggered PCell;

4> consider the target candidate PSCell within the stored condRRCReconfig, associated to that condReconfigId, as a triggered PSCell;

4> initiate the conditional reconfiguration execution, as specified in 5.3.5.13.5.

2> if one of the events associated to the measIds within condTriggerConfig for the applicable cell within the stored condRRCReconfig is not configured with nesEvent, and the other event associated to the measIds within condTriggerConfig for the applicable cell within the stored condRRCReconfig is configured with nesEvent, and at least one of them is fulfilled:

3> consider the applicable cell within the stored condRRCReconfig, associated to that condReconfigId, as a triggered cell;

3> initiate the conditional reconfiguration execution, as specified in 5.3.5.13.5;

NOTE 1: Up to 2 MeasId can be configured for each condReconfigId, if condExecutionCondPSCell is not configured. The conditional reconfiguration event of the 2 MeasId may have the same or different event conditions, triggering quantity, time to trigger, and triggering threshold.

NOTE 2: Void.

NOTE 3: For CHO with candidate SCG(s), up to 2 MeasId can be configured for condExecutionCond and up to 2 MeasId can be configured for condExecutionCondPSCell for each condReconfigId.

. . .

5.3.5.18.6 LTM Cell Switch Execution

Upon the indication by lower layers that an LTM cell switch procedure is triggered, or upon performing LTM cell switch following cell selection performed while timer T311 was running, as specified in 5.3.7.3, the UE shall:

1> if the LTM cell switch is triggered on the MCG:

2> release/clear all current dedicated and common radio configurations which have neither been received via SRB1 within mrdc-SecondaryCellGroup, nor via SRB3 except for the following:

the radio bearer configuration (configured via RadioBearerConfig)

the logicalChannelIdentity and logicalChannelIdentityExt of RLC bearers configured in RLC-BearerConfig and the associated RLC entities, their state variables, buffers, and timers, except for triggering the associated RLC entities to reset the variable RETX_COUNT its initial value, as specified in TS 38.322 [4];

the bh-LogicalChannelIdentity of BH RLC channels configured in BH-RLC-ChannelConfig and the associated RLC entities, their state variables, buffers, and timers, except for triggering the associated RLC entities to reset the variable RETX_COUNT its initial value, as specified in TS 38.322 [4];

the UE variables VarLTM-ServingCellNoResetID and VarLTM-ServingCellUE-MeasuredTA-ID;

the ltm-Config;

the MCG C-RNTI;

the AS security configurations associated with the master key;

the logged measurement configuration;

1> else, if the LTM cell switch is triggered on the SCG:

2> release/clear all current dedicated and common radio configurations which have been received either via SRB1 within mrdc-SecondaryCellGroup, or via SRB3 except for the following:

the radio bearer configuration (configured via RadioBearerConfig IE)

the logicalChannelIdentity and logicalChannelIdentityExt of RLC bearers configured in RLC-BearerConfig and the associated RLC entities, their state variables, buffers, and timers, except for triggering the associated RLC entities to reset the variable RETX_COUNT its initial value, as specified in TS 38.322 [4];

the bh-LogicalChannelIdentity of BH RLC channels configured in BH-RLC-ChannelConfig and the associated RLC entities, their state variables, buffers, and timers, except for triggering the associated RLC entities to reset the variable RETX_COUNT its initial value, as specified in TS 38.322 [4];

the UE variables VarLTM-ServingCellNoResetID and VarLTM-ServingCellUE-MeasuredTA-ID;

the ltm-Config;

the AS security configurations associated with the secondary key;

1> for each SRB/DRB in the current UE configuration:

2> if the LTM cell switch is triggered on the MCG and the SRB/DRB using the master key; or 2> if the LTM cell switch is triggered on the SCG and the SRB/DRB using the secondary key:

3> keep the associated PDCP and SDAP entities, their state variables, buffers and timers;

3> release all fields related to the SRB/DRB configuration except for srb-Identity and drb-Identity, 1> apply the default L1 parameter values as specified in corresponding physical layer specifications except for the parameters for which values are provided in SIB1;

1> use the default values specified in 9.2.3 for timers T310, T311 and constants N310, N311 associated with the cell group for which the LTM cell switch procedure is triggered, where T310, N310, and N311 are for both MCG and SCG, and T311 is only for the MCG;

1> apply the default MAC Cell Group configuration as specified in 9.2.2 for the cell group for which the LTM cell switch procedure is triggered;

1> for each srb-Identity in the current UE configuration:

2> apply the default SRB configuration defined in 9.2.1 for the corresponding SRB;

1> if the LTM-Candidate IE in ltm-Config indicated by lower layers or for the selected cell in accordance with 5.3.7.3 does not contain the field ltm-NoResetID and if the UE does not have any value stored of ltm-ServingCellNoResetID within VarLTM-ServingCellNoResetID; or 1> if the value of field ltm-NoResetID contained within the LTM-Candidate IE in ltm-Config indicated by lower layers or for the selected cell in accordance with 5.3.7.3 is not equal to the value of ltm-ServingCellNoResetID within VarLTM-ServingCellNoResetID:

2> for each logicalChannelIdentity and logicalChannelIdentityExt that is part of the current UE configuration for the cell group for which the LTM cell switch procedure is triggered:

3> if servedRadioBearer is set to drb-Identity:

4> after the end of this procedure, re-establish the corresponding RLC entity as specified in TS 38.322 [4], after applying the LTM configuration in ltm-CandidateConfig within the LTM-Candidate IE in ltm-Config;

2> for each bh-LogicalChannelIdentity that is part of the current UE configuration for the cell group for which the LTM cell switch procedure is triggered:

3> after the end of this procedure, re-establish the corresponding RLC entity as specified in TS 38.322 [4], after applying the LTM configuration in ltm-CandidateConfig within the LTM-Candidate IE in ltm-Config;

2> for each drb-Identity value that is part of the current UE configuration:

3> if this DRB is an AM DRB:

4> after the end of this procedure, trigger the PDCP entity of this DRB to perform data recovery as specified in TS 38.323 [5], after applying the LTM configuration in ltm-CandidateConfig within LTM-Candidate IE in ltm-Config;

2> if the value of field ltm-NoResetID contained within the LTM-Candidate IE in ltm-Config indicated by lower layers or for the selected cell in accordance with 5.3.7.3 is not equal to the value of ltm-ServingCellNoResetID within VarLTM-ServingCellNoResetID:

3> replace the value of ltm-ServingCellNoResetID in VarLTM-ServingCellNoResetID with the value of ltm-NoResetID in the LTM-Candidate in ltm-Config indicated by lower layers or for the selected cell in accordance with 5.3.7.3;

1> if the LTM-Candidate IE in ltm-Config indicated by lower layers or for the selected cell in accordance with 5.3.7.3 contains the field ltm-UE-MeasuredTA-ID:

2> if the value of ltm-UE-MeasuredTA-ID is not equal to the value of ltm-ServingCellUE-MeasuredTA-ID within VarLTM-ServingCellUE-MeasuredTA-ID:

3> replace the value of ltm-ServingCellUE-MeasuredTA-ID in VarLTM-ServingCellUE-MeasuredTA-ID with the value received within ltm-UE-MeasuredTA-ID;

3> for each LTM-Candidate IE in ltm-Config:

4> if the value of ltm-UE-MeasuredTA-ID within LTM-Candidate IE is equal to the value of ltm-ServingCellUE-MeasuredTA-ID within VarLTM-ServingCellUE-MeasuredTA-ID:

5> inform lower layers that the UE is configured with UE-based TA measurements for the LTM-Candidate;

4> else:

5> inform lower layers that the UE is not configured with UE-based TA measurements for the LTM-Candidate;

NOTE 0: The UE is not expected to perform UE-based TA measurements for an SpCell.

1> else if the LTM-Candidate IE in ltm-Config indicated by lower layers or for the selected cell in accordance with 5.3.7.3 does not contain the field ltm-UE-MeasuredTA-ID:

2> inform lower layers that the UE is not configured with UE-based TA measurements for the LTM-Candidate.

1> if ltm-ConfigComplete is not included within the LTM-Candidate IE in ltm-Config indicated by lower layers or for the selected cell in accordance with 5.3.7.3:

2> consider ltm-ReferenceConfiguration in ltm-Config, associated with the cell group for which the LTM cell switch procedure is triggered, to be the current UE configuration for the fields and configurations to be released by the actions above in this procedure;

2> if measConfig is included within ltm-ReferenceConfiguration in ltm-Config;

3> perform the measurement configuration procedure as specified in clause 5.5.2 by considering the measConfig within ltm-ReferenceConfiguration in ltm-Config as the received measConfig:

NOTE 1: When the UE considers the reference configuration to be the current UE configuration, the UE should store fields and configurations that are part of the reference configuration but should not execute any actions or procedures triggered by the reception of an RRCReconfiguration message which are described in clause 5.3.5.3, unless specified otherwise in this clause.

1> if the LTM cell switch is triggered by an indication from lower layers:

2> apply the RRCReconfiguration message in ltm-CandidateConfig within LTM-Candidate IE in ltm-Config identified by the LTM candidate configuration identity received from lower layers according to clause 5.3.5.3;

1> else (LTM cell switch triggered upon cell selection performed while timer T311 was running):

2> apply the RRCReconfiguration message in ltm-CandidateConfig within LTM-Candidate IE in ltm-Config related to the LTM candidate configuration identity for the selected cell (i.e., in accordance with 5.3.7.3) according to clause 5.3.5.3;

1> release the radio bearer(s) and the logical channel(s) that were part of the UE configuration before of this LTM cell switch procedure but not part of the LTM candidate configuration either indicated by lower layers or for the selected cell in accordance with 5.3.7.3, or the LTM reference configuration (in case the LTM candidate configuration does not include ltm-ConfigComplete).

NOTE 2: When ltm-ConfigComplete is not included for an LTM candidate configuration, before an LTM cell switch is triggered a UE implementation may generate and store an RRCReconfiguration message by applying the received LTM candidate configuration on top of the LTM reference configuration, and the stored RRCReconfiguration message is applied when the LTM cell switch is triggered. It is up to the UE to ensure that the RRC reconfiguration applied at the time of LTM cell switch is in accordance with the latest LTM reference configuration and LTM candidate configuration.

. . .

5.5.4.4 Event A3 (Neighbour Becomes Offset Better than SpCell)

The UE shall:

1> consider the entering condition for this event to be satisfied when condition A3-1, as specified below, is fulfilled;

1> consider the leaving condition for this event to be satisfied when condition A3-2, as specified below, is fulfilled;

1> use the SpCell for Mp, Ofp and Ocp.

NOTE 1: The cell(s) that triggers the event has reference signals indicated in the measObjectNR associated to this event which may be different from the NR SpCell measObjectNR.

Inequality A3-1 (Entering Condition)

$$Mn+Ofn+Ocn-Hys>Mp+Ofp+Ocp+Off$$

Inequality A3-2 (Leaving Condition)

$$Mn+Ofn+Ocn+Hys<Mp+Ofp+Ocp+Off$$

The variables in the formula are defined as follows:

Mn is the measurement result of the neighbouring cell, not taking into account any offsets.

Ofn is the measurement object specific offset of the reference signal of the neighbour cell (i.e. offsetMO as defined within measObjectNR corresponding to the neighbour cell).

Ocn is the cell specific offset of the neighbour cell (i.e. cellIndividualOffset as defined within measObjectNR corresponding to the frequency of the neighbour cell, or cellIndividualOffset as defined within reportConfigNR), and set to zero if not configured for the neighbour cell.

Mp is the measurement result of the SpCell, not taking into account any offsets.

Ofp is the measurement object specific offset of the SpCell (i.e. offsetMO as defined within measObjectNR corresponding to the SpCell).

Ocp is the cell specific offset of the SpCell (i.e. cellIndividualOffset as defined within measObjectNR corresponding to the SpCell), and is set to zero if not configured for the SpCell.

Hys is the hysteresis parameter for this event (i.e. hysteresis as defined within reportConfigNR for this event).

Off is the offset parameter for this event (i.e. a3-Offset as defined within reportConfigNR for this event).

Mn, Mp are expressed in dBm in case of RSRP, or in dB in case of RSRQ and RS-SINR.

Ofn, Ocn, Ofp, Ocp, Hys, Off are expressed in dB.

NOTE 2: The definition of Event A3 also applies to CondEvent A3.

5.5.4.5 Event A4 (Neighbour Becomes Better than Threshold)

The UE shall:

1> consider the entering condition for this event to be satisfied when condition A4-1, as specified below, is fulfilled;

1> consider the leaving condition for this event to be satisfied when condition A4-2, as specified below, is fulfilled.

Inequality A4-1 (Entering Condition)

$$Mn+Ofn+Ocn-Hys>Thresh$$

Inequality A4-2 (Leaving Condition)

$$Mn+Ofn+Ocn+Hys<Thresh$$

The variables in the formula are defined as follows:

Mn is the measurement result of the neighbouring cell or the measurement result of serving PSCell (i.e., in case it is configured as candidate PSCell for CondEvent A4 evaluation) for CHO with candidate SCG(s) case, not taking into account any offsets.

Ofn is the measurement object specific offset of the neighbour cell (i.e. offsetMO as defined within measObjectNR corresponding to the neighbour cell).

Ocn is the measurement object specific offset of the neighbour cell (i.e. cellIndividualOffset as defined within measObjectNR corresponding to the neighbour cell, or cellIndividualOffset as defined within reportConfigNR), and set to zero if not configured for the neighbour cell.

Hys is the hysteresis parameter for this event (i.e. hysteresis as defined within reportConfigNR for this event).

Thresh is the threshold parameter for this event (i.e. a4-Threshold as defined within reportConfigNR for this event).

Mn is expressed in dBm in case of RSRP, or in dB in case of RSRQ and RS-SINR.

Ofn, Ocn, Hys are expressed in dB.

Thresh is expressed in the same unit as Mn.

NOTE: The definition of Event A4 also applies to CondEvent A4.

5.5.4.6 Event A5 (SpCell Becomes Worse than Threshold1 and Neighbour Becomes Better than Threshold2)

The UE shall:

1> consider the entering condition for this event to be satisfied when both condition A5-1 and condition A5-2, as specified below, are fulfilled;

1> consider the leaving condition for this event to be satisfied when condition A5-3 or condition A5-4, i.e. at least one of the two, as specified below, is fulfilled;

1> use the SpCell for Mp.

NOTE 1: The parameters of the reference signal(s) of the cell(s) that triggers the event are indicated in the measObjectNR associated to the event which may be different from the measObjectNR of the NR SpCell.

Inequality A5-1 (Entering Condition 1)

$$Mp + Hys < Thresh1$$

Inequality A5-2 (Entering Condition 2)

$$Mn + Ofn + Ocn - Hys > Thresh2$$

Inequality A5-3 (Leaving Condition 1)

$$Mp - Hys > Thresh1$$

Inequality A5-4 (Leaving Condition 2)

$$Mn + Ofn + Ocn + Hys < Thresh2$$

The variables in the formula are defined as follows:

Mp is the measurement result of the NR SpCell, not taking into account any offsets.

Mn is the measurement result of the neighbouring cell, not taking into account any offsets.

Ofn is the measurement object specific offset of the neighbour cell (i.e. offsetMO as defined within measObjectNR corresponding to the neighbour cell).

Ocn is the cell specific offset of the neighbour cell (i.e. cellIndividualOffset as defined within measObjectNR corresponding to the neighbour cell, or cellIndividualOffset as defined within reportConfigNR), and set to zero if not configured for the neighbour cell.

Hys is the hysteresis parameter for this event (i.e. hysteresis as defined within reportConfigNR for this event).

Thresh1 is the threshold parameter for this event (i.e. a5-Threshold1 as defined within reportConfigNR for this event).

Thresh2 is the threshold parameter for this event (i.e. a5-Threshold2 as defined within reportConfigNR for this event).

Mn, Mp are expressed in dBm in case of RSRP, or in dB in case of RSRQ and RS-SINR.

Ofn, Ocn, Hys are expressed in dB.

Thresh1 is expressed in the same unit as Mp.

Thresh2 is expressed in the same unit as Mn.

NOTE 2: The definition of Event A5 also applies to CondEvent A5.

6.2.2 Message Definitions

. . .

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3

RLC-SAP: AM

Logical channel: DCCH

Direction: Network to UE

RRCReconfiguration message

```
RRCReconfiguration ::=                SEQUENCE {
  rrc-TransactionIdentifier             RRC-TransactionIdentifier,
  criticalExtensions                    CHOICE {
    rrcReconfiguration                    RRCReconfiguration-IEs,
    criticalExtensionsFuture              SEQUENCE { }
  }
}
RRCReconfiguration-IEs ::=            SEQUENCE {
  radioBearerConfig                     RadioBearerConfig
OPTIONAL, -- Need M
  secondaryCellGroup                    OCTET STRING (CONTAINING CellGroupConfig)
OPTIONAL, -- Cond SCG
  measConfig                            MeasConfig
OPTIONAL, -- Need M
  lateNonCriticalExtension              OCTET STRING
OPTIONAL,
  nonCriticalExtension                  RRCReconfiguration-v1530-IEs
OPTIONAL
}
RRCReconfiguration-v1530-IEs ::=        SEQUENCE {
  masterCellGroup                       OCTET STRING (CONTAINING CellGroupConfig)
OPTIONAL, -- Need M
  fullConfig                            ENUMERATED {true}
OPTIONAL, -- Cond FullConfig
  dedicatedNAS-MessageList              SEQUENCE (SIZE(1..maxDRB)) OF DedicatedNAS-Message
OPTIONAL, -- Cond nonHO
  masterKeyUpdate                       MasterKeyUpdate
OPTIONAL, -- Cond MasterKeyChange
  dedicatedSIB1-Delivery                OCTET STRING (CONTAINING SIB1)
OPTIONAL, -- Need N
  dedicatedSystemInformationDelivery    OCTET STRING (CONTAINING SystemInformation)
OPTIONAL, -- Need N
  otherConfig                           OtherConfig
OPTIONAL, -- Need M
  nonCriticalExtension                  RRCReconfiguration-v1540-IEs
OPTIONAL
}
```

-continued

RRCReconfiguration message

```
RRCReconfiguration-v1540-IEs ::=        SEQUENCE {
   otherConfig-v1540                         OtherConfig-v1540
OPTIONAL, -- Need M
   nonCriticalExtension                      RRCReconfiguration-v1560-IEs
OPTIONAL
}
RRCReconfiguration-v1560-IEs ::=          SEQUENCE {
   mrdc-SecondaryCellGroupConfig             SetupRelease { MRDC-SecondaryCellGroupConfig }
OPTIONAL,   -- Need M
   radioBearerConfig2                        OCTET STRING (CONTAINING RadioBearerConfig)
OPTIONAL,   -- Need M
   sk-Counter                                SK-Counter
OPTIONAL,   -- Need N
   nonCriticalExtension                      RRCReconfiguration-v1610-IEs
OPTIONAL
}
RRCReconfiguration-v1610-IEs ::=        SEQUENCE {
   otherConfig-v1610                         OtherConfig-v1610
OPTIONAL, -- Need M
   bap-Config-r16                            SetupRelease { BAP-Config-r16 }
OPTIONAL, -- Need M
   iab-IP-AddressConfigurationList-r16       IAB-IP-AddressConfigurationList-r16
OPTIONAL, -- Need M
   conditionalReconfiguration-r16            ConditionalReconfiguration-r16
OPTIONAL, -- Need M
...}
RRCReconfiguration-v1800-IEs ::=        SEQUENCE {
   needForInterruptionConfigNR-r18           ENUMERATED { disabled, enabled }
OPTIONAL, -- Need M
   aerial-Config-r18                              SetupRelease { Aerial-Config-r18 }
OPTIONAL, -- Need M
   sl-IndirectPathAddChange-r18                   SetupRelease { SL-IndirectPathAddChange-r18 }
OPTIONAL, -- Need M
   n3c-IndirectPathAddChange-r18                  SetupRelease { N3C-IndirectPathAddChange-r18 }
OPTIONAL, -- Need M
   n3c-IndirectPathConfigRelay-r18                SetupRelease { N3C-IndirectPathConfigRelay-r18 }
OPTIONAL, -- Need M
   otherConfig-v1800                              OtherConfig-v1800
OPTIONAL, -- Need M
   srs-PosResourceSetAggBW-CombinationList-r18 SetupRelease { SRS-PosResourceSetAggBW-
CombinationList-r18 }    OPTIONAL, -- Need M
   ltm-Config-r18                                 SetupRelease {LTM-Config-r18}
OPTIONAL, -- Need M
   nonCriticalExtension                           RRCReconfiguration-v1830-IEs
OPTIONAL
}
RRCReconfiguration-v1830-IEs ::=        SEQUENCE {
   otherConfig-v1830                         OtherConfig-v1830
OPTIONAL, -- Need M
   nonCriticalExtension                      SEQUENCE { }
OPTIONAL
}
MRDC-SecondaryCellGroupConfig ::=       SEQUENCE {
   mrdc-ReleaseAndAdd                        ENUMERATED {true}
OPTIONAL,   -- Need N
   mrdc-SecondaryCellGroup                   CHOICE {
      nr-SCG                                      OCTET STRING (CONTAINING RRCReconfiguration),
      eutra-SCG                                   OCTET STRING
   }
}
...
```

RRCReconfiguration-IEs field descriptions

...

conditionalReconfiguration

Configuration of candidate target SpCell(s) and execution condition(s) for conditional handover, conditional PSCell addition or conditional PSCell change. The field is absent if any DAPS bearer is configured, if the sl-L2RemoteUE-Config or sl-L2RelayUE-Config is configured, or if the RRCReconfiguration message is contained within condRRCReconfig. When the masterCellGroup and/or secondaryCellGroup includes ReconfigurationWithSync, if this field is present, it only includes configurations/fields specific to subsequent CPAC. The RRCReconfiguration message contained in DLInformation TransferMRDC cannot contain the field conditionalReconfiguration for conditional PSCell -continued

| RRCReconfiguration-IEs field descriptions |
| --- |
| change or for conditional PSCell addition. |
| ltm-Config<br>The network does not configure this field in an RRCReconfiguration message contained in ltm-CandidateConfig. |
| masterCellGroup<br>Configuration of master cell group. |
| mrdc-ReleaseAndAdd<br>This field indicates that the current SCG configuration is released and a new SCG is added at the same time. |
| mrdc-SecondaryCellGroup<br>Includes an RRC message for SCG configuration in NR-DC or NE-DC.<br>For NR-DC (nr-SCG), mrdc-SecondaryCellGroup contains the RRCReconfiguration message as generated (entirely) by SN gNB. In this version of the specification, the RRC message can only include fields secondaryCellGroup, otherConfig, conditionalReconfiguration, ltm-Config, measConfig, bap-Config, IAB-IP-AddressConfigurationList and appLayerMeasConfig.<br>For NE-DC (eutra-SCG), mrdc-SecondaryCellGroup includes the E-UTRA RRCConnectionReconfiguration message as specified in TS 36.331 [10]. In this version of the specification, the E-UTRA RRC message can only include the field scg-Configuration. |
| mrdc-SecondaryCellGroupConfig<br>This field is used to configure and release an SCG in NR-DC and NE-DC. In case the RRCReconfiguration message is part of an LTM-Candidate IE associated with the MCG, if this field is present its value can only be set to release. |

6.3.2 Radio Resource Control Information Elements

. . .

LTM-Candidate

The IE LTM-Candidate concerns a LTM candidate configuration to add or modify.

LTM-Candidate information element

```
LTM-Candidate-r18 ::=   SEQUENCE {
   ltm-CandidateId-r18              LTM-CandidateId-r18,
   ltm-CandidatePCI-r18             PhysCellId
OPTIONAL,   -- Need M
   ltm-SSB-Config-r18               LTM-SSB-Config-r18
OPTIONAL,   -- Need M
   ltm-CandidateConfig-r18          OCTET STRING (CONTAINING RRCReconfiguration)
OPTIONAL,   -- Need M
   ltm-ConfigComplete-r18           ENUMERATED {true}
OPTIONAL,   -- Need R
   ltm-EarlyUL-SyncConfig-r18       OCTET STRING (CONTAINING EarlyUL-SyncConfig-r18)
OPTIONAL,   -- Need R
   ltm-EarlyUL-SyncConfigSUL-r18    OCTET STRING (CONTAINING EarlyUL-SyncConfig-r18)
OPTIONAL,   -- Need R
   ltm-TCI-Info-r18                 LTM-TCI-Info-r18
OPTIONAL,   -- Need M
   ltm-NoResetID-r18                INTEGER (1..maxNrofLTM-Configs-plus1-r18)
OPTIONAL,   -- Need M
   ltm-UE-MeasuredTA-ID-r18         INTEGER (1..maxNrofLTM-Configs-plus1-r18)
OPTIONAL,   -- Need M
   ...
}
...
```

| LTM-Candidate field descriptions |
| --- |
| ltm-CandidateConfig<br>This field includes an RRCReconfiguration message used to configure an LTM candidate configuration. |
| ltm-CandidatePCI<br>This field identifies the PCI of the SpCell of the LTM candidate configuration contained in ltm-CandidateConfig. |
| ltm-EarlyUL-SyncConfig, ltm-EarlyUL-SyncConfigSUL<br>A configuration used to perform the early UL synchronization procedure over an UL or SUL carrier. |
| ltm-NoResetID<br>If the network configures this field for one LTM candidate configuration, the network configures also for all LTM candidate configurations within ltm-CandidateToAddModList in LTM-Config. |
| ltm-UE-MeasuredTA-ID<br>If the network configures this field for one LTM candidate configuration, the network configures also for all LTM candidate configurations within ltm-CandidateToAddModList in LTM-Config and ensures that the UE has stored a value for ltm-ServingCellUE-MeasuredTA-ID within VarLTM-ServingCellUE-MeasuredTA-ID. This field is absent if tag2 is present for this LTM candidate configuration. |

LTM-Config

The IE LTM-Config is used to provide LTM configurations.

LTM-Config information element

```
LTM-Config-r18 ::=   SEQUENCE {
   ltm-ReferenceConfiguration-r18                  SetupRelease {ReferenceConfiguration-r18}
OPTIONAL,   -- Need M
   ltm-CandidateToReleaseList-r18                  SEQUENCE (SIZE (1..maxNrofLTM-Configs-r18)) OF LTM-
CandidateId-r18   OPTIONAL,   -- Need N
   ltm-CandidateToAddModList-r18                   SEQUENCE (SIZE (1..maxNrofLTM-Configs-r18)) OF LTM-
Candidate-r18      OPTIONAL,   -- Need N
   ltm-ServingCellNoResetID-r18                    INTEGER (1..maxNrofLTM-Configs-plus1-r18)
OPTIONAL,   -- Need N
   ltm-CSI-ResourceConfigToAddModList-r18            SEQUENCE (SIZE (1..maxNrofLTM-CSI-ResourceConfigurations-
r18)) OF LTM-CSI-ResourceConfig-r18
OPTIONAL,   -- Need N
   ltm-CSI-ResourceConfigToReleaseList-r18           SEQUENCE (SIZE (1..maxNrofLTM-CSI-ResourceConfigurations-
r18)) OF LTM-CSI-ResourceConfigId-r18
OPTIONAL,   -- Need N
   attemptLTM-Switch-r18                           ENUMERATED {true}
OPTIONAL,   -- Cond LTM-MCG
   ltm-ServingCellUE-MeasuredTA-ID-r18             INTEGER (1..maxNrofLTM-Configs-plus1-r18)
OPTIONAL,   -- Need N
   ...
}
...
```

ConfiguredGrantConfig

The IE ConfiguredGrantConfig is used to configure uplink transmission without dynamic grant according to two possible schemes. The actual uplink grant may either be configured via RRC (type1) or provided via the PDCCH (addressed to CS-RNTI) (type2). Multiple Configured Grant configurations may be configured in one BWP of a serving cell.

ConfiguredGrantConfig information element

```
ConfiguredGrantConfig ::=               SEQUENCE {
   resourceAllocation                   ENUMERATED { resourceAllocationType0,
resourceAllocationType1, dynamicSwitch },
...
   periodicity                          ENUMERATED {
                                             sym2, sym7, sym1x14, sym2x14, sym4x14, sym5x14,
sym8x14, sym10x14, sym16x14, sym20x14,
                                             sym32x14, sym40x14, sym64x14, sym80x14, sym128x14,
sym160x14, sym256x14, sym320x14, sym512x14,
                                             sym640x14, sym1024x14, sym1280x14, sym2560x14,
sym5120x14,
                                             sym6, sym1x12, sym2x12, sym4x12, sym5x12, sym8x12,
sym10x12, sym16x12, sym20x12, sym32x12,
                                             sym40x12, sym64x12, sym80x12, sym128x12, sym160x12,
sym256x12, sym320x12, sym512x12, sym640x12,
                                             sym1280x12, sym2560x12
   },
   configuredGrantTimer                 INTEGER (1..64)
OPTIONAL,   -- Need R
   rrc-ConfiguredUplinkGrant            SEQUENCE {
      timeDomainOffset                     INTEGER (0..5119),
      timeDomainAllocation                 INTEGER (0..15),
      frequencyDomainAllocation            BIT STRING (SIZE(18)),
      antenna Port                         INTEGER (0..31),
      dmrs-SeqInitialization               INTEGER (0..1)
OPTIONAL,   -- Need R
      precodingAndNumberOfLayers           INTEGER (0..63),
      srs-ResourceIndicator                INTEGER (0..15)
OPTIONAL,   -- Need R
...
}
....
```

TAG-Config

The IE TAG-Config is used to configure parameters for a time-alignment group.

TAG-Config information element

```
TAG-Config ::=              SEQUENCE {
  tag-ToReleaseList           SEQUENCE (SIZE (1..maxNrofTAGs)) OF
                              TAG-Id
OPTIONAL,   -- Need N
  tag-ToAddModList            SEQUENCE (SIZE (1..maxNrofTAGs)) OF
                              TAG
OPTIONAL    -- Need N
}
TAG ::=                     SEQUENCE {
  tag-Id                      TAG-Id,
  timeAlignmentTimer          TimeAlignmentTimer,
  ...
}
TAG-Id ::=                  INTEGER (0..maxNrofTAGs-1)
```

TAG field descriptions tag-Id
Indicates the TAG of the SpCell or an SCell, see TS 38.321 [3]. Uniquely identifies the TAG within the scope of a Cell Group (i.e. MCG or SCG).
timeAlignmentTimer
The timeAlignmentTimer for TAG with ID tag-Id, as specified in TS 38.321 [3].

TCI-State

The IE TCI-State associates one or two DL reference signals with a corresponding quasi-colocation (QCL) type.

TCI-State information element

```
TCI-State ::=                   SEQUENCE {
  tci-StateId                     TCI-StateId,
  qcl-Type1                       QCL-Info,
  qcl-Type2                       QCL-Info
OPTIONAL,   -- Need R
  ...,
  [[
  additionalPCI-r17               AdditionalPCIIndex-r17
OPTIONAL,   -- Need R
  pathlossReferenceRS-Id-r17      PathlossReferenceRS-Id-r17
OPTIONAL,   -- Cond JointTCI1
  ul-powerControl-r17             Uplink-powerControlId-r17
OPTIONAL    -- Cond JointTCI
  ]],
  [[
  tag-Id-ptr-r18                  ENUMERATED {n0,n1}
OPTIONAL    -- Cond 2TA
  ]]
}
QCL-Info ::=                    SEQUENCE {
  cell                            ServCellIndex
OPTIONAL,   -- Need R
  bwp-Id                          BWP-Id
OPTIONAL, -- Cond CSI-RS-Indicated
  referenceSignal                 CHOICE {
    csi-rs                          NZP-CSI-RS-ResourceId,
    ssb                             SSB-Index
  },
  qcl-Type                        ENUMERATED {typeA, typeB, typeC,
                                typeD},
  ...
}
```

QCL-Info field descriptions bwp-Id
The DL BWP which the RS is located in. If the field is absent, the RS is located in the DL BWP in which the TCI-State is applied by the UE.
cell
The UE's serving cell in which the referenceSignal is configured. If the field is absent, the referenceSignal is configured in the serving cell in which the TCI-State is applied by the UE. The RS can be located on a serving cell other than the serving cell for which the TCI-State is applied by the UE only if the qcl-Type is configured as typeC or typeD. If the referenceSignal is set to csi-rs and unifiedTCI-StateType is configured, either both cell and bwp-Id are present or both cell and bwp-Id are absent. See TS 38.214 [19] clause 5.1.5.
referenceSignal
Reference signal with which quasi-collocation information is provided as specified in TS 38.214 [19] clause 5.1.5.
qcl-Type
QCL type as specified in TS 38.214 [19] clause 5.1.5.

TCI-State field descriptions additionalPCI
Indicates the physical cell IDs (PCI) of the SSBs when referenceSignal is configured as SSB for both QCL-Type1 and QCL-Type2. In case the cell is present, the additionalPCI refers to a PCI value configured in the list configured using additionalPCI-ToAddModList in the serving cell indicated by the field cell. Otherwise, it refers to a PCI value configured in a list additionalPCI-ToAddModList configured in the serving cell where the TCI-State is applied by the UE. When this
field is present the cell for qcl-Type1 and qcl-Type2 is configured with same value, if present.
pathlossReferenceRS-Id
The ID of the reference signal (e.g. a CSI-RS or an SS block) used for PUSCH, PUCCH and SRS path loss estimation. This field refers to an element in the list configured using pathlossReferenceRSToAddModList in the serving cell and UL BWP where the TCI State is applied by the UE.
qcl-Type1, qcl-Type2
QCL information for the TCI state as specified in TS 38.214 [19] clause 5.1.5.
tag-Id-ptr -continued

| TCI-State field descriptions |
|---|
| It indicates the TAG that is associated with this TCI state, value no means the TCI state associate with the TAG indicated by tag-Id, value n1 means this TCI state associated with the TAG indicated by tag2-Id. The tag-Id-ptr refers to the TAG of the serving cell where the TCI state is applied. |
| tci-StateId |
| ID number of the TCI state. |
| ul-PowerControl |
| Configures power control parameters for PUCCH, PUSCH and SRS for this TCI state. The field is present here only if ul-powerControl is not configured in any BWP-Uplink-Dedicated of this serving cell. This field refers to an element in the list configured using uplink-PowerControlToAddModList in the serving cell where the dl-OrJointTCI-StateToAddModList is configured. |

In 38.300 ([3] 3GPP TS 38.300 v18.3.0), L1/L2 Triggered Mobility is introduced:

9.2.3.5 L1/L2 Triggered Mobility 9.2.3.5.1 General

LTM is a procedure in which a gNB receives L1 measurement report(s) from a UE, and on their basis the gNB may change UE serving cell by a cell switch command signalled via a MAC CE. The cell switch command indicates an LTM candidate configuration that the gNB previously prepared and provided to the UE through RRC signalling. Then the UE switches to the target configuration according to the cell switch command. The LTM procedure can be used to reduce the mobility latency as described in Annex G.

When configured by the network, it is possible to activate TCI states of one or multiple cells that are different from the current serving cell. For instance, the TCI states of the LTM candidate cells can be activated in advance before any of those cells become the serving cell. This allows the UE to be DL synchronized with those cells, thereby facilitating a faster cell switch to one of those cells when cell switch is triggered. All the activated TCI states except those received in the cell switch command are deactivated upon LTM cell switch execution.

When configured by the network, it is possible to initiate UL TA acquisition (called early TA) procedure of one or multiple cells that are different from the current serving cells. If the cell has the same $N_{TA}$ as the current serving cells or $N_{TA}=0$, early TA acquisition procedure is not required. The network may request the UE to perform early TA acquisition of a candidate cell before a cell switch. The early TA acquisition procedure is triggered by PDCCH order as specified in clause 9.2.6 or realized through UE-based TA measurement as configured by RRC. In the former case, the gNB/gNB-DU to which the candidate cell belongs calculates the TA value and sends it to the gNB/gNB-DU to which the serving cell belongs via gNB-CU. The serving cell sends the TA value in the LTM cell switch command MAC CE when triggering LTM cell switch. In the latter case, the UE performs TA measurement for the candidate cells after being configured by RRC but the exact time the UE performs TA measurement is up to UE implementation. The UE applies the TA value measured by itself and performs RACH-less LTM upon receiving the cell switch command, if it does not include any valid TA value. The network may also send a TA value in the LTM cell switch command MAC CE without early TA acquisition.

When two TAG IDs are configured for an LTM candidate cell, the gNB-DU to which the LTM candidate cell belongs assigns the same TAG ID pointer values for each TRP to be used by the UEs.

Depending on the availability of a valid TA value, the UE performs either a RACH-less LTM or RACH-based LTM cell switch. If the valid TA value is provided in the cell switch command, the UE applies the TA value as instructed by the network. In the case where UE-based TA measurement is configured, but no valid TA value is provided in the cell switch command, the UE applies the valid TA value by itself if available. The UE performs RACH-less LTM cell switch upon receiving the cell switch command whenever a valid TA value is available. If no valid TA value is available, the UE performs RACH-based LTM cell switch.

Regardless of whether the UE is configured for UE-based TA measurement for a certain candidate cell, it will still follow the PDCCH order, which includes performing a random access procedure towards one or more candidate cells. This also applies to the candidate cells for which the UE is capable of deriving TA values by itself. Additionally, regardless of whether the UE has already performed a random access procedure towards the candidate cells, it will still follow the UE-based measurement configuration if configured by the network.

For RACH-less LTM, the UE accesses the target cell using either a configured grant or a dynamic grant. The configured grant is provided in the LTM candidate configuration, and the UE selects the configured grant occasion associated with the beam indicated in the cell switch command. Upon initiation of LTM cell switch to the target cell, the UE starts to monitor PDCCH on the target cell for dynamic scheduling. Before RACH-less LTM procedure completion, the UE shall not trigger random access procedure if it does not have a valid PUCCH resource for triggered SRs.

The following principles apply to LTM:

Security keys are maintained upon an LTM cell switch;

Subsequent LTM is supported.

LTM supports both intra-gNB-DU and inter-gNB-DU mobility within the same gNB-CU. LTM supports both intra-frequency and inter-frequency mobility, including mobility to inter-frequency cell that is not a current serving cell. LTM is supported only for licensed spectrum. The following scenarios are supported:

PCell change in non-CA scenario and non-DC scenario;

PCell and SCell(s) change in CA scenario;

Dual connectivity scenario: including PCell and MCG SCell(s) change and intra-SN PSCell and SCG SCell(s) change without MN involvement. LTM for simultaneous PCell and PSCell change is not supported.

While the UE has stored LTM candidate configurations the UE can also execute any L3 handover except for DAPS handover. In the RRC message which the UE applies for any L3 handover (except DAPS), LTM candidate configurations can be added/modified/released by the target cell.

9.2.3.5.2 C-Plane Handling

Cell switch command is conveyed in a MAC CE, which contains the necessary information to perform the LTM cell switch.

Figure 9:
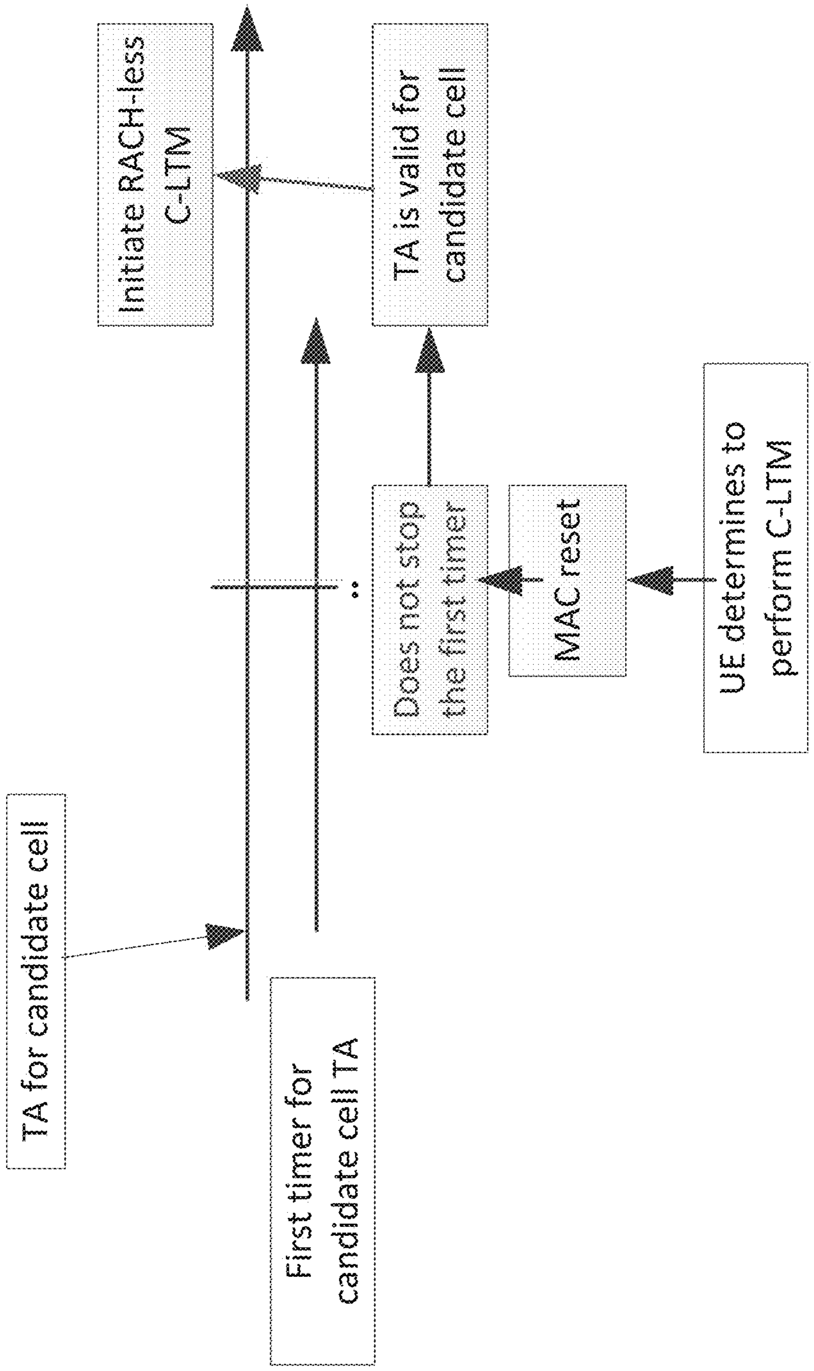
FIG. 9 is an example diagram showing a UE being configured with a candidate cell associated with a (conditional) LTM Candidate configuration, in accordance with embodiments of the present invention.

The overall procedure for LTM is shown in FIG. 9.2.3.5.2-1 below. Subsequent LTM is done by repeating the early synchronization, LTM cell switch execution, and LTM cell switch completion steps without releasing other LTM candidate configurations after each LTM cell switch completion. The general procedure over the air interface is applicable to SCG LTM. Further details of SCG LTM can be found in TS 37.340 [21].

FIG. 6 is a reproduction of FIG. 9.2.3.5.2-1. Signalling procedure for LTM, from 3GPP TS 38.300 v18.3.0.

The procedure for LTM is as follows:

1. The UE sends a MeasurementReport message to the gNB. The gNB decides to configure LTM and initiates LTM preparation.
2. The gNB transmits an RRCReconfiguration message to the UE including the LTM candidate configurations.
3. The UE stores the LTM candidate configurations and transmits an RRCReconfigurationComplete message to the gNB.

4a. The UE performs DL synchronization with the LTM candidate cell(s) before receiving the cell switch command. The UE may activate and deactivate TCI states of LTM candidate cell(s), as triggered by the gNB.

4b. The UE may perform UL synchronization with LTM candidate cell(s) before receiving the cell switch command, by using UE-based TA measurement, if configured, and/or by transmitting a preamble towards the candidate cell, as triggered by the gNB. When UE-based TA measurement is configured, UE acquires the TA value(s) of the candidate cell(s) by measurement. UE performs early TA acquisition with the candidate cell(s) as requested by the network before receiving the cell switch command as specified in clause 9.2.6. This is done via CFRA triggered by a PDCCH order from the source cell, following which the UE sends preamble towards the indicated candidate cell. In order to minimize the data interruption of the source cell due to CFRA towards the candidate cell(s), the UE does not receive random access response from the network for the purpose of TA value acquisition and the TA value of the candidate cell is indicated in the cell switch command. The UE does not maintain the TA timer for the candidate cell and relies on network implementation to guarantee the TA validity.

5. The UE performs L1 measurements on the configured LTM candidate cell(s) and transmits L1 measurement reports to the gNB. L1 measurement should be performed as long as RRC reconfiguration (step 2) is applicable.
6. The gNB decides to execute cell switch to a target cell and transmits an LTM cell switch command MAC CE triggering cell switch by including a target configuration ID which indicates the index of the candidate configuration of the target cell, a beam indicated with a TCI state or beams indicated with DL and UL TCI states, and a timing advance command for the target cell, if available. The UE switches to the target cell and applies the candidate configuration indicated by the target configuration ID.
7. The UE performs the random access procedure towards the target cell, if UE does not have valid TA of the target cell as specified in clause 5.18.35 of TS 38.321 [6].
8. The UE completes the LTM cell switch procedure by sending RRCReconfigurationComplete message to target cell. If the UE has performed a RA procedure in step 7 the UE considers that LTM cell switch execution is successfully completed when the random access procedure is successfully completed. For RACH-less LTM, the UE considers that LTM cell switch execution is successfully completed when the UE determines that the network has successfully received its first UL data.

The steps 4-8 can be performed multiple times for subsequent LTM cell switch executions using the LTM candidate configuration(s) provided in step 2.

The procedure over the air interface described in FIG. 9.2.3.5.2-1 is applicable to both intra-gNB-DU LTM and inter-gNB-DU LTM. The overall LTM procedures over F1-C interface are captured in TS 38.401 [4].

9.2.3.5.3 U-Plane Handling

After receiving an LTM cell switch command MAC CE, the UE performs MAC reset. Whether the UE performs RLC re-establishment and PDCP data recovery during cell switch is explicitly controlled by the network through RRC signalling.

In 38.211 ([4] 3GPP TS 38.211 v18.3.0), timing advance is introduced:

$N_{TA}$ Timing advance between downlink and uplink; see clause 4.3.1

. . .

4.3.1 Frames and Subframes

Downlink, uplink, and sidelink transmissions are organized into frames with $T_f=(\Delta f_{max}N_f/100)\cdot T_c=10$ ms duration, each consisting of ten subframes of $T_{sf}=(\Delta f_{max}N_f/1000)\cdot T_c=1$ ms duration. The number of consecutive OFDM symbols per subframe is $$N_{symb}^{subframe,\mu}=N_{symb}^{slot}N_{slot}^{subframe,\mu}.$$

Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $$T_{TA}=\left(N_{TA}+N_{TA,offset}+N_{TA,adj}^{common}+N_{TA,adj}^{UE}\right)T_c$$

before the start of the corresponding downlink frame at the UE where $N_{TA}$ and $N_{TA,offset}$ are given by clause 4.2 of [5, TS 38.213], except for msgA transmission on PUSCH where $N_{TA}=0$ shall be used;

$$N_{TA,adj}^{common}$$

given by clause 4.2 of [5, TS 38.213] is derived from the higher-layer parameters ta-Common, ta-CommonDrift, and ta-CommonDriftVariant if configured, otherwise $$N_{TA,adj}^{common}=0;$$

$$N_{TA,adj}^{UE}$$

given by clause 4.2 of [5, TS 38.213] is computed by the UE based on UE position and serving-satellite-ephemeris-related higher-layers parameters if configured, otherwise $$N_{TA,adj}^{UE} = 0.$$

Figure 7:
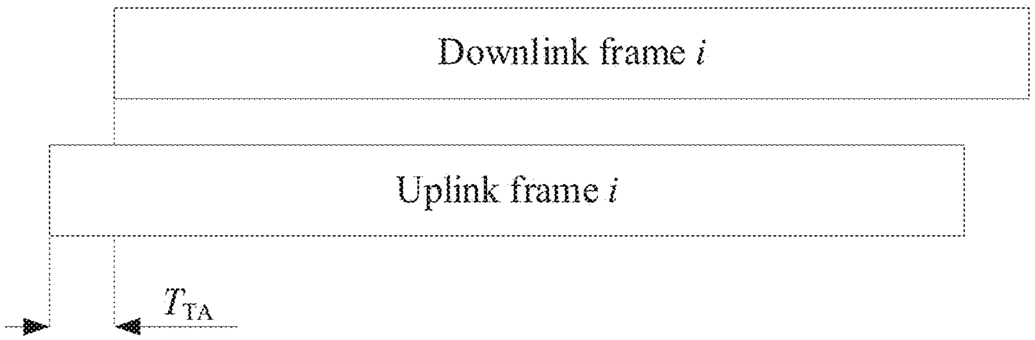
FIG. 7 (PRIOR ART)
FIG. 7 is a reproduction of FIG. 4.3.1-1: Uplink-downlink timing relation, from 3GPP TS 38.211 v18.3.0.

FIG. 7 is a reproduction of FIG. 4.3.1-1: Uplink-downlink timing relation, from 3GPP TS 38.211 v18.3.0.

In 38.213 ([5] 3GPP TS 38.213 v18.4.0), L1/L2 mobility procedure for physical layer is introduced:

21 L1/L2-Triggered Mobility Procedures

A UE can be indicated, by LTM-Config, candidate cells and SS/PBCH blocks per candidate cell for the UE to obtain synchronization and measure corresponding L1-RSRPs [10, TS 38.133]. A Candidate Cell TCI States Activation/Deactivation MAC CE can activate TCI states, provided by CandidateTCI-State or/and CandidateTCI-UL-State, associated with SS/PBCH blocks or TRS of corresponding candidate cells [11, TS 38.321]. The RS index for obtaining the candidate cell downlink pathloss estimate is provided by pathlossReferenceRS-Id in the CandidateTCI-State or CandidateTCI-UL-State. If the Candidate Cell TCI States Activation/Deactivation MAC CE activates TCI states, an LTM Cell Switch Command MAC CE can indicate a TCI state from the activated TCI states; otherwise, the LTM Cell Switch Command MAC CE can activate and indicate a TCI state, provided by CandidateTCI-State or/and CandidateTCI-UL-State. After reception of the LTM Cell Switch Command MAC CE, activated TCI states that are not indicated by the MAC CE are deactivated. The UE is provided configurations by Itm-CSI-ReportConfigToAddModList for reporting L1-RSRP measurements [6, TS 38.214] that include a number of candidate cells and a number of SS/PBCH blocks per candidate cell from the number of candidate cells.

If ltm-UE-MeasuredTA-ID of a candidate cell and Itm-ServingCellUE-MeasuredTA-ID of the serving cell are provided to a UE and have same value, the UE estimates based on the UE implementation a timing advance to apply from a first transmission on the candidate cell that is after the reception of a cell switch command for the candidate cell when the condition defined in clause 5.18.35 of [11, TS 38.321] is satisfied.

A UE can be provided configurations, by EarlyUL-SyncConfig, for PRACH transmission parameters for each of the candidate cells. The UE can be triggered a PRACH transmission on a candidate cell by a PDCCH order that the UE receives on a serving cell and includes an indication of the candidate cell for the PRACH transmission [4, TS 38.212]. If the serving cell and the candidate cell operate in a same frequency range and the UE would have transmissions that overlap in time, or when a gap between a first or last symbol of a PRACH transmission to the candidate cell is less than N symbols from a last or first symbol, respectively, of an UL transmission to the serving cell, where N is defined in Clause 8.1, the UE drops the transmissions on the serving cell when the UE does not support transmissions that overlap in time or are separated by less than the gap on the serving cell and the candidate cell and the UL transmission to the serving cell is other than a RACH Msg 1, Msg A, or Msg 3 transmission.

prioritizes power allocation to the PRACH transmission on the candidate cell in clause 7.5 when the UE supports transmissions that overlap in time or are separated by less than the gap, and a total UE transmit power in the frequency range would exceed $\hat{P}_{CMAX}$.

The UE transmits the PRACH on the candidate cell as described in Clause 8.1 with a power determined as described in Clause 7.4.

A UE can be provided by a LTM Cell Switch Command MAC CE in a PDSCH reception on the serving cell [11, TS 38.321] a TCI state ID and/or an UL TCI state ID indicating a CandidateTCI-State and/or CandidateTCI-UL-State from Itm-DL-OrJointTCI-StateToAddModList and/or Itm-UL-TCI-StateToAddModList [6, TS 38.214] for applicable receptions or transmissions on a candidate cell from the number of candidate cells. The UE may assume that DM-RS antenna ports for PDCCH receptions and for PDSCH receptions are quasi co-located with the SS/PBCH block or the TRS in the TCI state with respect to quasi co-location 'typeA' and 'typeD' properties, when applicable. The UE does not expect to be indicated quasi co-location 'typeA' properties when a SS/PBCH block is configured as a source RS of the TCI state. The UE applies the CandidateTCI-State and/or CandidateTCI-UL-State, if indicated by the MAC CE, no later than $T_{LTM\text{-}RRC\text{-}processing}+T_{LTM\text{-}processing}+T_{first\text{-}RS}+T_{RS\text{-}proc}+3$ msec after the last symbol of a PUCCH or PUSCH with HARQ-ACK information for the PDSCH providing the MAC CE, where $T_{LTM\text{-}RRC\text{-}processing}$, $T_{LTM\text{-}processing}$, $T_{first\text{-}RS}$ and $T_{RS\text{-}proc}$ are defined in [10, TS 38.133]. For RACH-based LTM cell switch [19, TS 38.300], the UE applies the CandidateTCI-State for receptions on the candidate cell, and applies a spatial domain filter corresponding to the CandidateTCI-State or the CandidateTCI-UL-State for transmissions on the candidate cell, that are after the completion of the random access procedure associated with the PRACH transmission on the candidate cell and before a new TCI state is indicated for the candidate cell. For RACH-less LTM cell switch [19, TS 38.300], the UE applies the CandidateTCI-State for receptions on the candidate cell and applies a spatial domain filter corresponding to the CandidateTCI-State or the CandidateTCI-UL-State for transmissions on the candidate cell before a new TCI state is indicated for the candidate cell.

21.1 Configured-Grant PUSCH Transmission in RACH-Less LTM Cell Switch

A UE configured to perform PUSCH transmission in RACH-less LTM cell switch can be provided one or more configurations by respective one or more ConfiguredGrantConfig, for configured grant Type 1 PUSCH transmissions on the active UL BWP [12, TS 38.331]. For the remaining of this clause, PUSCH transmissions refer to configured grant Type-1 PUSCH transmissions for a configuration provided by ConfiguredGrantConfig.

. . .

In WID for mobility enhancement ([6] RP-242356), conditional LTM is introduced:

Specify support of conditional Intra-CU LTM [RAN2, RAN3, RAN1]

Specify UE evaluated conditions for triggering LTM

Aim to support conditional LTM including subsequent LTM

Limit specifying the conditional LTM to the scenario where the UE is in non-DC

Checkpoint at RAN #107 to review the objective on whether Intra-CU conditional LTM can be specified to DC scenarios and if so, to which cases. RAN WG work to not start before this checkpoint In 3GPP meeting RAN2 #128 ([7] Draft_RAN2_128_Meeting_Report), agreements were made regarding conditional LTM:

| Agreements on C-LTM: |
| --- |
| 1. The triggering condition of conditional LTM can be based on L3 measurement.<br>2. CondEventA3 and CondEventA5 conditions can be baseline for the conditional LTM execution.<br>3. The L1 execution condition of a candidate cell is associated to only one triggering event.<br>4. For L3 execution condition, it may consist of one or two triggering condition(s). If there are two triggering conditions associated with the same candidate cell, the UE shall consider the execution condition is fulfilled only when both triggering conditions are met. Only single RS type is supported and at most two different trigger quantities can be configured simultaneously for the evaluation of execution condition of a single candidate cell.<br>5. To support initial and subsequent conditional LTM, the following items can be considered for the configuration of execution condition:<br>The CLTM configuration of each candidate cell shall include the execution condition for initial conditional LTM, which is generated by the initial source cell to trigger the CLTM for the candidate cell.<br>The CLTM configuration of each candidate cell may include execution conditions for subsequent conditional LTM, which is generated by the candidate cell to trigger the CLTM for other candidate cells when the candidate cell becomes a serving cell.<br>6. The network can configure measurement reports e.g., L1 periodic, semi-persistent, aperiodic and event triggered report, or L3 measurement reports for conditional LTM, e.g., to trigger PDCCH ordered early RACH.<br>7. For CLTM, the Candidate Cell TCI States Activation/Deactivation MAC CE is re-used for the early activation/deactivation of TCI state(s) of a CLTM candidate configuration.<br>8. The Early TA is signalled to the UE from the source cell (i.e., not from the candidate cell directly to the UE). This agreement will be included in the LS to RAN1/3/4.<br>9. The network can inform the candidate cell's TA information to UE via new MAC CE, which is the TA value when UE switches to that candidate cell during CLTM.<br>10. Candidate cell TA is maintained by a new timer.<br>11. For L1-based conditional LTM the condition evaluation is at MAC level and for L3-based conditional LTM the condition evaluation is at RRC level. |

In New Radio (NR) Release 18, Layer 1 (L1)/Layer 2 (L2)-triggered mobility (LTM) procedure is introduced. The User Equipment (UE) could be triggered by a Network (NW) via a Medium Access Control (MAC) Control Element (CE) (LTM Cell Switch Command MAC CE) to perform the (LTM) Cell switch. An LTM procedure could be a Random Access Channel (RACH)-based (Contention-Based Random Access (CBRA) or Contention-Free Random Access (CFRA)) or a RACH-less LTM procedure. The UE could determine whether to perform a RACH-less LTM procedure based on at least whether there is a valid Timin Advance (TA) for a target candidate cell of the LTM procedure. A UE could be configured with a configured uplink grant (e.g., configured grant Type 1) for transmitting message(s) (e.g., Radio Resource Control (RRC) reconfiguration complete message or LTM complete message) to the target candidate cell in a RACH-less LTM procedure to the target candidate cell. Alternatively in certain embodiments, the UE could be provided with a dynamic uplink grant (from the target candidate cell) for transmission of the message(s). A valid TA could be provided by the network (e.g., via an LTM Cell switch Command MAC CE) or measured by the UE (itself). A candidate Cell could be associated with a Timing Advance Group (TAG) for time alignment. A candidate Cell could be associated with or could include multiple TAs that are associated with different Transmission/Reception Points (TRPs). The candidate Cell could be associated with more than one TAG. In Rel-18, the UE considers a configured uplink grant for RACH-less LTM switch as valid when a Synchronization Signal Block (SSB) corresponding to the configured uplink grant has the same SSB index as an SSB associated with a Transmission Configuration Indicator (TCI) state indicated by a TCI state Identity (ID) field in an LTM Cell Switch Command MAC CE.

In NR Rel-19, conditional LTM is introduced for L1/L2-triggered mobility. The UE could (determine to) trigger or initiate an LTM procedure to a target candidate cell in response to a triggering condition or event being met or fulfilled. The triggering condition or event could be associated with beam quality or cell quality or quality changes associated with a serving cell (e.g., Special Cell (SpCell)) and/or candidate cell(s) (e.g., quality of Serving Cell is lower than a threshold and/or quality of a candidate cell is higher than a threshold (plus an offset)). For conditional LTM, a RACH-less procedure could also be supported. The UE could perform RACH-less LTM to switch to a target candidate cell associated with a triggered event for conditional LTM if or when the UE has a valid TA for the target candidate cell. The UE could obtain a valid TA based on UE-based measurement or based on a NW providing a TA for a candidate cell to the UE (via a MAC CE). The UE could perform an early uplink synchronization (random access) procedure to a candidate cell (triggered by a Physical Downlink Control Channel (PDCCH) order from a NW) (for the NW) to calculate TA associated with the candidate cell for the UE. The UE could maintain a candidate cell TA by a timer (e.g., different from a time alignment timer). For example, the UE could start or restart the candidate cell TA timer in response to receiving a MAC CE or a signaling indicating TA of the associated candidate cell from the NW. The UE could consider the TA of the candidate cell as valid when the timer is running. The UE could consider the TA as not valid if the timer is not running or expired. The TA timer could be maintained per TAG of the candidate cell or could be maintained per LTM configuration or could be maintained per candidate cell. A candidate cell could be an SpCell associated with an LTM candidate configuration (LTM-config or LTM-Candidate) or a cell associated with ltm-CandidatePCI in an LTM candidate.

In the NR specification, a UE could perform a MAC reset in response to indication from upper layers (e.g., RRC layers) and/or in response to radio link failure, handover (reconfiguration with sync), etc. When a UE performs a MAC reset, the UE stops all running timers (except Multicast-Broadcast Service (MBS) broadcast Discontinuous Reception (DRX) timers) and considers time Alignment Timer(s) to be expired. An issue could occur when the UE initiates a (conditional) LTM procedure on a candidate cell, the UE applies a configuration associated with the candidate cell and performs a MAC reset. If the UE stops all timers including the timer used for maintaining TA for candidate cells, or if the UE considers the timer as expired, the UE may not consider the TA as valid and may not perform a RACH-less (conditional) LTM. Furthermore, if the timer expires and the TA is considered as invalid during an ongoing RACH-less LTM, the UE may not be able to perform an Uplink (UL) transmission on the target candidate cell via configured uplink grants and may need to perform RACH-based LTM, which would lead to latency in cell switch.

With the present invention, methods and examples are introduced for handling timer maintenance for candidate cells for conditional LTM.

MAC reset: stop timers and consider TA timer to be expired.

Does not consider Timer for candidate cell TA maintenance to be expired.

Does not stop TA timers for handling candidate cell TAs for RACH-less Conditional LTM (C-LTM).

What does the UE do when a new TA timer expires? When to NOT consider the TA timer as expired.

One concept of the present invention is that a UE may not stop a first timer associated with a candidate cell and/or may not consider the first timer to be expired in response to a MAC reset of the UE. The UE could consider a TA of the candidate cell to be valid when the first timer is running (for the candidate cell). The UE could determine whether to perform a (conditional) RACH-less LTM based on at least whether the TA of the candidate cell is valid (or at least whether the candidate cell has a valid TA). The UE could determine whether to perform a (conditional) RACH-less LTM on the candidate cell based on at least whether the first timer associated with the candidate cell is running (for the candidate cell). The first timer is different from a second timer associated with the candidate cell. The second timer could be timeAlignmentTimer associated with the candidate cell.

The candidate cell could be a SpCell (e.g., Primary Cell (PCell)) of a Cell group associated with an LTM candidate configuration (e.g., LTM-config, or LTM-Candidate). The LTM candidate configuration could contain an RRC reconfiguration message including at least a Cell configuration of the candidate cell.

The UE may not stop the first timer associated with the candidate cell or may not consider the first timer to be expired in response to a MAC reset of the UE. Additionally and/or alternatively in certain embodiments, the UE could stop the first timer or could consider the first timer to be expired in response to a MAC reset of the UE. Additionally and/or alternatively in certain embodiments, the UE could restart the first timer (if running (for the candidate cell)) in response to a MAC reset of the UE. The MAC reset could be associated with a MAC entity or a Cell group associated with an LTM candidate configuration associated with the candidate cell. Additionally and/or alternatively in certain embodiments, the UE could stop the first timer associated with the candidate cell in response to initiation of a (RACH-less) conditional LTM on the candidate cell. Additionally and/or alternatively in certain embodiments, the UE could stop the first timer associated with the candidate cell or consider the first timer to be expired in response to (or after) considering a RACH-less LTM switch to be ongoing or in response to (or after) indicating upper layers (e.g., RRC layer) to skip a Random access procedure for an LTM cell switch.

Additionally and/or alternatively in certain embodiments, the UE could determine whether to stop the first timer or consider the first timer as expired in response to a MAC reset based on at least a triggering/initiation cause of the MAC reset. The MAC reset could be initiated for or based on a (RACH-less) conditional LTM Cell Switch. The MAC reset may not be initiated in response to or based on an LTM Cell switch (e.g., initiated in response to Radio Link Failure (RLF) or reconfiguration with sync or in response to RRC connection re-establishment). For example, the UE could stop the first timer and/or consider the first timer to be expired in response to or when performing a MAC reset if or when the MAC reset is performed not in response to or based on a (conditional and/or RACH-less) LTM Cell switch (on the candidate cell). Additionally and/or alternatively in certain embodiments, the UE may not stop the first timer and/or may not consider the first timer to be expired in response to or when performing a MAC reset if or when the MAC reset is performed in response to a (conditional and/or RACH-less) LTM Cell switch (on the candidate cell or on other candidate cell(s)). Alternatively in certain embodiments, the UE could stop the first timer and/or consider the first timer to be expired in response to or when performing a MAC reset if or when the MAC reset is performed in response to a (conditional and/or RACH-less) LTM Cell switch on other/another candidate cell(s) than the candidate cell associated with the first timer. Additionally and/or alternatively in certain embodiments, the UE may not stop the first timer and/or may not consider the first timer to be expired in response to or when performing a MAC reset if or when the MAC reset is performed in response to causes other than LTM Cell Switch (e.g., Radio Link Failure, RLF, or reconfiguration with sync or in response to RRC connection re-establishment).

Additionally and/or alternatively in certain embodiments, the UE could stop the first timer and/or consider the first timer to be expired in response to or when performing a MAC reset if or when the MAC reset is performed in response to a first set of causes (e.g., LTM and/or RLF, and/or RRC re-establishment and/or reconfiguration with sync) and may not stop the first timer and/or consider the first timer to be expired if or when the MAC reset is performed in response to a second set of causes (e.g., LTM and/or Sidelink MAC reset, RLF, and/or RRC re-establishment and/or reconfiguration with sync).

Two timers:

1. a new timer for handling TA for candidate cell (what behaviors to do when the new timer expires);
2. timealignmenttimer for the target candidate cell when performing Cell switch (when to start the timealignment timer for C-LTM).

Additionally and/or alternatively in certain embodiments, for handling of the first timer associated with the candidate cell, the UE could (re) start/stop/consider the first timer to be expired according to at least one of the following conditions or actions in one or more combinations:

The UE may not stop the first timer associated with the candidate cell in response to at least one of:

- Performing a MAC reset;
- Performing a MAC reset corresponding to an LTM procedure (on the candidate cell);

- Performing a MAC reset not corresponding to a (conditional and/or RACH-less) LTM (on the candidate cell);
- Receiving an LTM Cell switch Command MAC CE indicating the candidate cell (or other candidate cell(s));
- Starting a second timer (timeAlignmentTimer) associated with the candidate cell;
- Initiation or completion of a Reconfiguration with sync (to the candidate cell or to other cells);
- Initiation or completion of a (RACH-less) conditional LTM procedure on the candidate cell; and/or
- Initiation or completion of a (conditional or not-conditional) LTM procedure (on the candidate cell or on other candidate cell(s)).

The UE could stop the first timer associated with the candidate cell in response to or after:

- Initiation or completion of a (RACH-less) conditional LTM procedure on the candidate cell;
- Initiation or completion of a (conditional or not-conditional) LTM procedure (on the candidate cell or on other candidate cell(s));
- Considering a RACH-less (conditional) LTM cell switch associated with the candidate cell to be ongoing;
- Performing a MAC reset corresponding to an LTM procedure (on the candidate cell);
- Performing a MAC reset not corresponding to a (conditional and/or RACH-less) LTM (on the candidate cell or on other candidate cell(s));
- Receiving an LTM Cell switch Command MAC CE indicating the candidate cell (or other candidate cell(s));
- Applying a TA associated with the first timer;
- Reconfiguration of a candidate configuration associated with the candidate cell;
- Starting a second timer (timeAlignmentTimer) associated with the candidate cell;
- Initiation or completion of a Reconfiguration with sync (to the candidate cell or to other cell(s));
- Radio link failure (on a Serving Cell); and/or
- Initiation or completion of an early uplink synchronization to the candidate cell.

The UE could consider the first timer associated with the candidate cell to be expired in response to:

- Initiation or completion of a (RACH-less) conditional LTM procedure on the candidate cell;
- Initiation or completion of an LTM procedure (on the candidate cell or on other candidate cell(s));
- Considering a RACH-less (conditional) LTM cell switch associated with the candidate cell to be ongoing;
- Performing a MAC reset corresponding to an LTM procedure (on the candidate cell);
- Performing a MAC reset not corresponding to a (conditional and/or RACH-less) LTM (on the candidate cell or on other candidate cell(s));
- Receiving an LTM Cell switch Command MAC CE indicating the candidate cell (or other candidate cell(s));
- Applying a TA associated with the first timer on a candidate cell;
- Reconfiguration of a candidate configuration associated with the candidate cell; and/or
- Initiation or completion an early uplink synchronization to the candidate cell.

The UE could start or restart the first timer associated with the candidate cell in response to:

- Receiving a MAC CE indicating a TA for the candidate cell (The MAC CE may not be an LTM Cell switch Command MAC CE);
- Receiving a MAC CE indicating a TA for other candidate cell(s) (than the candidate cell) (the MAC CE does not indicate a TA for the candidate cell);
- Receiving an LTM Cell Switch Command MAC CE; and/or
- Initiation or completion of an early uplink synchronization to the candidate cell.

Figure 8:
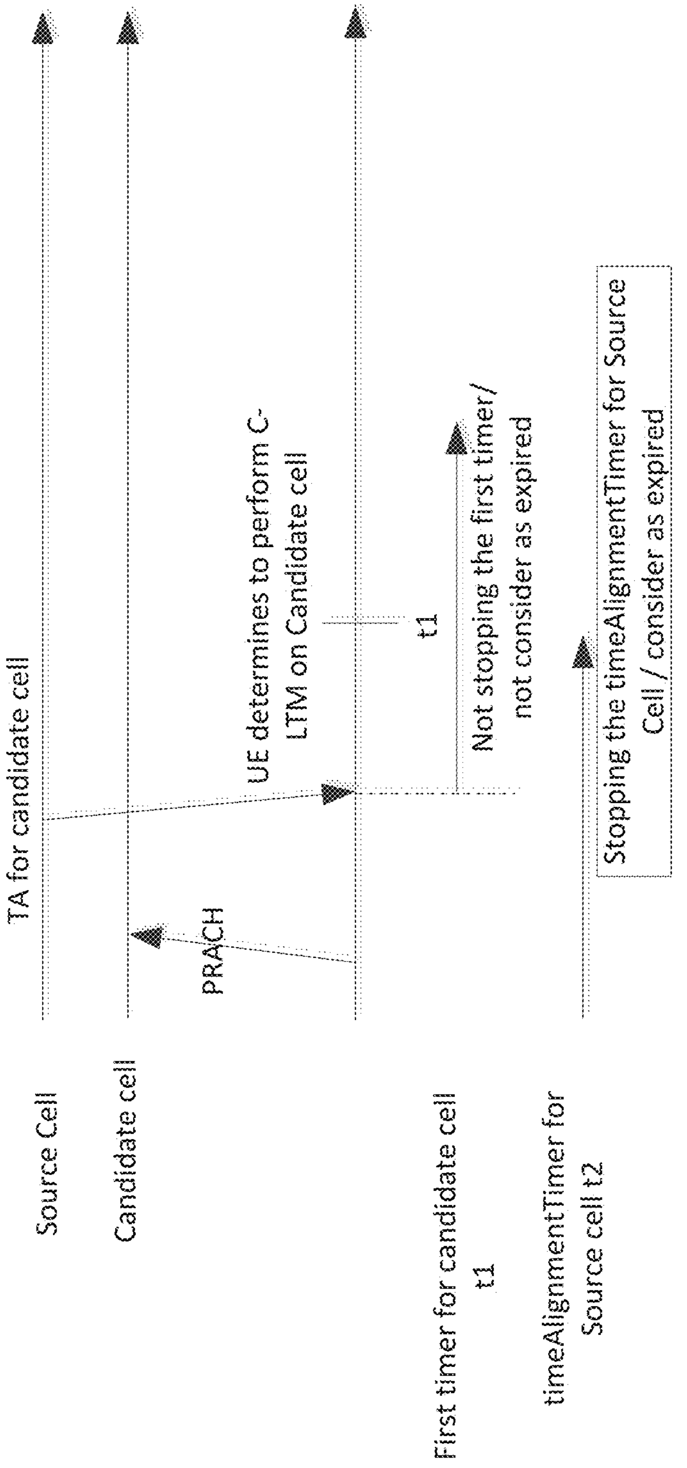
FIG. 8 is an example diagram showing a UE being configured with a candidate cell associated with an LTM Candidate configuration, in accordance with embodiments of the present invention.

An example is shown in FIG. 8. A UE could be configured with a candidate cell associated with an LTM Candidate configuration. The UE could perform early uplink synchronization to the candidate cell via a random access procedure (triggered by the NW) and could receive a TA for the candidate cell (from a Source Cell). In response to receiving the TA, the UE could start a first timer for the candidate cell, t1, to maintain the TA for the candidate cell. The UE could maintain a timeAlignmentTimer t2 for the Source Cell. At timing t1, the UE determines to perform a conditional LTM on the candidate cell (e.g., perform Cell switch switching SpCell of the UE to the candidate cell). The UE could perform MAC reset and could stop all timers including stopping the timeAlignmentTimer and/or consider the timeAlignmentTimer as expired for the Source Cell. The UE may not stop the first timer when performing the MAC reset. Based on the first timer being running (for the candidate cell) and/or based on the TA for the candidate cell being valid, the UE considers a conditional RACH-less LTM to be ongoing.

Additionally and/or alternatively in certain embodiments, in response to expiry of the first timer, the UE could perform at least one of the following actions:

- Consider the TA associated with the candidate cell as invalid;
- Not maintaining TA for the candidate cell;
- Deactivate (UL) TCI states for the candidate cell;
- Stores and/or maintain $N_{TA}$ for the candidate cell;
- Discard $N_{TA}$ and/or consider the $N_{TA}$ as invalid for the candidate cell;
- Release and/or clear a configured uplink grant for the candidate cell;
- Does not release and/or clear a configured uplink grant for the candidate cell;
- Indicate, to a network, (e.g., via a MAC CE or a Physical Uplink Control Channel (PUCCH) or a report) that the first timer associated with the candidate cell is expired;
- Transmit or indicate a request for early uplink synchronization (for the candidate cell); and/or
- Trigger or transmit a UE-initiated (beam) report (candidate cell(s)).

Additionally and/or alternatively in certain embodiments, in response to stopping of the first timer, the UE could perform at least one of the following actions:

- Not maintaining TA for the candidate cell;
- Consider the TA associated with the candidate cell as invalid;
- Does not consider the TA associated with the candidate cell as invalid;
- Deactivate (UL) TCI states for the candidate cell; and/or
- Stores and/or maintain $N_{TA}$ for the candidate cell.

An example is shown in FIG. 9. A UE could be configured with a candidate cell associated with a (conditional) LTM Candidate configuration. The UE could receive a TA (via a MAC CE) for the candidate cell from a NW. In response to receiving the TA, the UE could start a first timer associated with the candidate cell. The first timer associated with the candidate cell could be associated with time alignment or TA validity of the candidate cell. The UE could determine to perform a conditional LTM on the candidate cell and performs a MAC reset. In the MAC reset, the UE does not stop the first timer (and does not stop a second timer associated with TA validity of a second candidate cell). The UE could then initiate a RACH-less conditional LTM to the candidate cell based on TA being valid (or the first timer being running) for the candidate cell.

Example text proposals are shown as below and one or multiple text proposals could be adopted to achieve the present invention:

How to apply timealignmenttimer for RACH-less C-LTM.

In legacy RACH-less LTM, TA is applied when receiving LTM Subcarrier Spacing (SCS) MAC CE and a timer is started.

=> For C-LTM, when to apply TA/start timer/start after a remaining value of the TA timer is maintaining the stored TA?

Additionally and/or alternatively in certain embodiments, the UE could be configured with a second timer associated with the candidate cell. The second timer could be associated with a TAG of the candidate cell. The second timer could be timeAlignmentTimer associated with the candidate cell. The first timer may not be a same timer as the second timer.

The UE could start or restart the second timer associated with the candidate cell in response to initiation of a (RACH-less) (conditional) LTM procedure on the candidate cell. The UE could start or restart the second timer associated with the candidate cell in response to or based on initiation of a (RACH-less) (conditional) LTM procedure on the candidate cell and the first timer associated with the candidate cell is running (for the candidate cell). The initiation of the LTM procedure could be triggered/determined by the UE (not in response to a MAC CE by a NW). The UE could apply and/or process a (valid) TA stored for the candidate cell in response to determination of initiation of a (RACH-less) (conditional) LTM if or when the (valid) TA is valid or available for the candidate cell.

The UE could start the second timer at a value derived based on at least a running time (remaining time or inherent time) of the first timer. The UE could determine a remaining time of the second timer (when the UE starts the second timer in response to initiation of RACH-less conditional LTM) based on at least a time passed of the first timer. For example, the UE could start the second timer (with configured length m) at a value n (e.g., n slots), wherein the first timer has been running (for the candidate cell) for a time window/time period with length n (e.g., the first timer has been running for n slots) when the UE determines to start the second timer. The second timer could have a remaining running time for [m−n].

Alternatively in certain embodiments, the second timer could be started with a remaining value/time period based on remaining time of the first timer. For example, the first timer could be configured with t slots and the UE determines to start the second timer when the first timer has been running (for the candidate cell) for n slots. The UE could start or resume the second timer with a remaining time of [t-n] slots.

Alternatively in certain embodiments, the UE could start the second timer at the beginning of its value (e.g., the second timer runs for m slots after starting the second timer).

Figure 10:
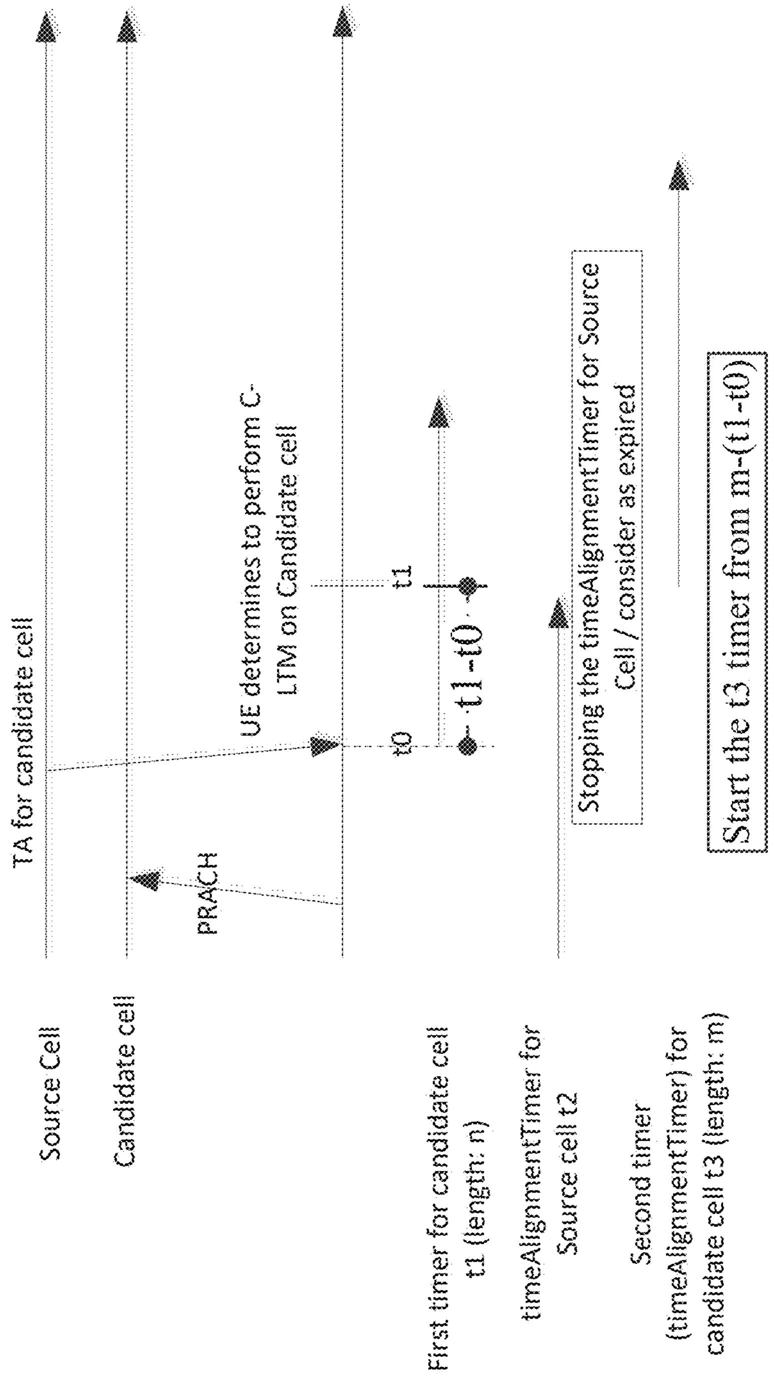
FIG. 10 is an example diagram showing a UE being configured with a first timer for a candidate cell t1 (with length n) and a second timer t3 (configured in a candidate configuration of the candidate cell with length m), in accordance with embodiments of the present invention.

Another example is shown in FIG. 10. The UE could be configured with a first timer for a candidate cell t1 (with length n) and a second timer t3 (configured in a candidate configuration of the candidate cell with length m). The length n could be different from the length m, alternatively, the length n could be a same value as m. At timing t0, the UE receives a TA for a candidate cell from a network. The UE starts a first timer associated with the candidate cell. At timing t1, the UE determines to perform LTM (conditional LTM) on the candidate cell. The UE could (based on the first timer being running (for the candidate cell)) apply TA of the candidate cell and perform RACH-less LTM. The UE could start the second timer in response to applying the TA and/or in response to the first timer being running (for the candidate cell). The UE could start the second timer at a value derived from remaining time of the second timer. The remaining time could be derived based on the total length of the second timer minus time passed for the first timer. For example, the second timer could be started at value 'm−(t1−t0)'.

Figure 11:
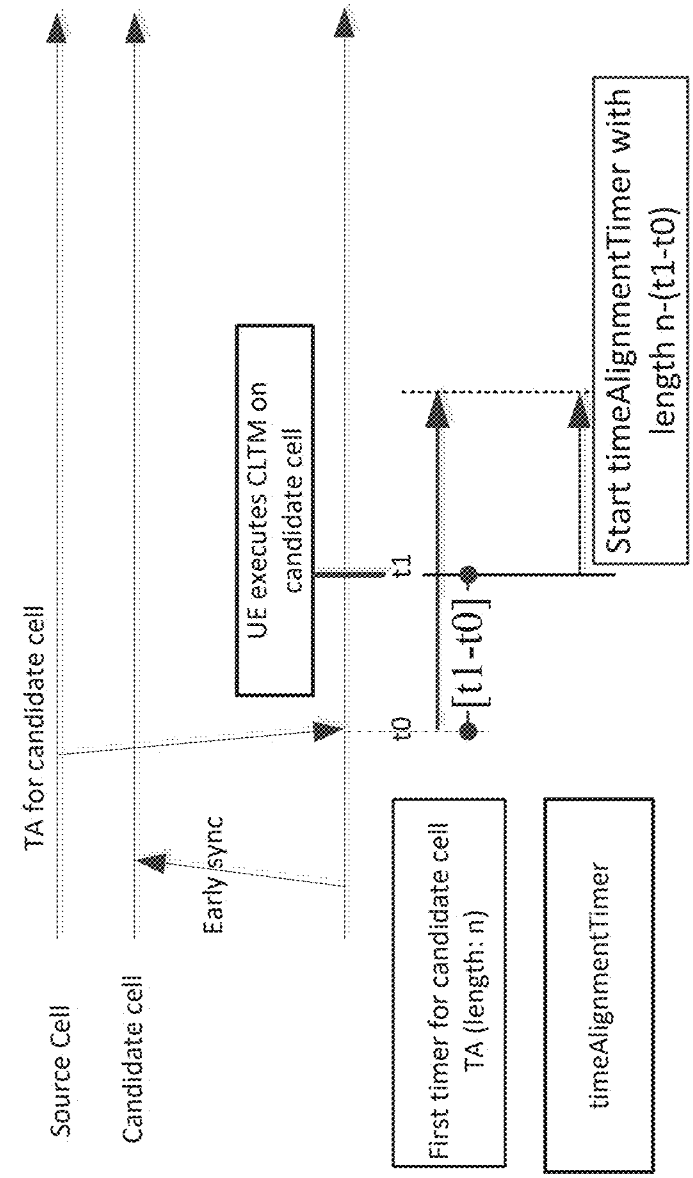
FIG. 11 is an example diagram showing a UE being configured with a first timer for candidate cell (with length n), in accordance with embodiments of the present invention.

Another example is shown in FIG. 11. The UE could be configured with a first timer for a candidate cell (with length n). The first timer may not be a timeAlignmentTimer. The first timer could be for time alignment of the candidate cell. The UE could perform an early synchronization procedure on the candidate cell (to obtain Timing advance of the candidate cell). The NW (or a Source Cell of the UE) could provide or indicate a Timing advance for the candidate cell (via a MAC CE). The UE could start the first timer in response to the Timing advance for the candidate cell (at timing t0). At timing t1, the UE determines to initiate/trigger/execute a conditional LTM procedure on the candidate cell. The UE could start a timeAlignmentTimer (of PTAG) using a remaining time of the first timer (e.g., a length or starting value of timeAlignmentTimer set to "n−(t1−t0)").

An example based on [1] 3GPP TS 38.321 v18.3.0 is provided below, with changes and edits shown with double curly brackets to show deletions, i.e., {{ . . . }}, and double carets to show additions/insertions, i.e., ^^...^^ :

--------------------------example 1 start----------------------------

5.18.35 LTM Cell Switch {{Command}}

The MAC entity shall:

^^ 1> if the MAC entity determines to perform an LTM cell switch on a candidate cell (of a target configuration):

2> indicate to upper layers that the conditional LTM cell switch procedure is triggered and the Target Configuration ID;

2> if the MAC reset operation as specified in clause 5.12 is performed, as requested by upper layers:

3> if the first timer for maintaining TA for the candidate cell or the Target configuration is running (for the candidate cell):

4> process the Timing Advance (see clause 5.2);

4> consider the RACH-less LTM cell switch to be ongoing;

4> if the MAC entity is associated with SCG:

5> indicate to upper layers to skip the Random Access procedure for this LTM cell switch. ^^

-------------------------------------example 1 end----------------------------------

---------------------------------example 2 start---------------------------------------
5.2 Maintenance of Uplink Time Alignment
^^ ...
1> when TA timer (first timer) for maintaining TA for candidate cell is running (for the candidate cell), or when TA for the candidate cell is valid:
2> apply the TA for the candidate cell;
2> start or restart the timeAlignmentTimer associated with PTAG for the candidate cell.^^
--------------------------------------example 2 end-----------------------------------

---------------------------------example 3 start---------------------------------------
5.2 Maintenance of Uplink Time Alignment
^^ ...
1> when TA timer (first timer) for maintaining TA for candidate cell is running (for the candidate cell), or when TA for the candidate cell is valid:
2> apply the TA for the candidate cell;
2> start or restart or resume the timeAlignmentTimer (starting at the remaining value of the TA timer) for the candidate cell.^^
--------------------------------------example 3 end-----------------------------------

The second timer could be started after the UE performs a MAC reset (in response to determining a (RACH-less) (conditional) LTM Cell switch to the candidate cell). Additionally and/or alternatively in certain embodiments, the second timer could be started before the UE performs a MAC reset (in response to determining a (RACH-less) (conditional) LTM Cell switch to the candidate cell). The UE may not stop the second timer and/or may not consider the second timer to be expired when performing the MAC reset.

If receiving a CSC MAC CE with FFF TA, the UE may still use the RACH-less if received MAC CE for TA beforehand and TA is valid.

Additionally and/or alternatively in certain embodiments, the UE could determine whether to perform a RACH-less LTM on a candidate cell based on at least whether a TA is valid for the candidate cell. The TA could be provided by the NW or measured by the UE. The TA provided by the NW could be indicated via an LTM Cell Switch Command MAC CE (for a target candidate cell) or a second MAC CE indicating TA for a candidate cell (e.g., before the UE determines to perform conditional LTM).

For example, in response to receiving an LTM Cell Switch Command MAC CE indicating (candidate configuration associated with) a candidate cell, the UE could perform RACH-less LTM on the candidate cell if or when at least one of the following is met:

Timing Advance Command value (hexa-decimal) is not set as 0xFFF;

The UE has successfully measured Timing Advance for the candidate cell; and/or

A first timer associated with the candidate cell is running (for the candidate cell).

In one example, in response to receiving an LTM Cell Switch Command MAC CE, the UE could perform RACH-less LTM on the candidate cell (or could consider a RACH-less LTM to be ongoing) at least if or when a first timer associated with the candidate cell is running (for the candidate cell) (regardless of the value of the Timing Advance Command field in the LTM Cell switch Command MAC CE).

In another example, in response to receiving an LTM Cell Switch Command MAC CE on the candidate cell, the UE may not perform a RACH-less LTM (or the UE may not consider a RACH-less LTM to be ongoing) if or when the UE does not measure TA for the candidate cell and the TA command value of the MAC CE is set as 0xFFF (even if the first timer associated with the candidate cell is running (for the candidate cell)).

The UE could consider the first timer associated with the candidate cell as expired and/or stop the first timer in response to receiving an LTM Cell Switch Command MAC CE (if or when the TA command field of the MAC CE is set to 0xFFF).

Additionally and/or alternatively in certain embodiments, a NW may not be allowed to provide an LTM Cell Switch Command MAC CE of which the TA command field being set to 0xFFF if or when the LTM Cell Switch Command MAC CE indicates a candidate cell and the candidate cell has a valid TA (provided by another MAC CE) or a first timer associated with the candidate cell is running (for the candidate cell).

Additionally and/or alternatively in certain embodiments, the NW may not provide a TA command field with a different value from a TA maintained by the UE (that was received from MAC CE from the NW). Additionally and/or alternatively in certain embodiments, the NW could provide/update a TA command via a LTM Cell switch command MAC CE (that includes a different TA value from the TA maintained by the UE). Additionally and/or alternatively in certain embodiments, the UE could (prioritize) apply the TA in the LTM Cell switch Command MAC CE (when performing LTM) over a TA maintained by the UE (for conditional LTM). Alternatively in certain embodiments, the UE may not apply the TA in the LTM Cell Switch Command MAC CE (and could apply the TA maintained by the UE) if or when the first timer is running or when the TA maintained by the UE is valid.

Additionally and/or alternatively in certain embodiments, the UE could determine whether to perform a RACH-less (conditional) LTM procedure on a candidate cell based on at least whether a first timer associated with the candidate cell will expire or not during the RACH-less (conditional) LTM procedure. Additionally and/or alternatively in certain embodiments, the UE could determine whether to perform a RACH-less (conditional) LTM procedure on a candidate cell based on at least whether a remaining time of the first timer associated with the candidate cell is longer than or equal to a threshold (when initiating or at the start of the RACH-less (conditional) LTM procedure or when an event or triggering condition is met or fulfilled (for a period of time) for initiating the RACH-less (conditional) LTM procedure). Additionally and/or alternatively in certain embodiments, after or in response to determining to perform/initiate a (conditional) LTM on the candidate cell, the UE could determine whether to perform a RACH-less or a RACH-based LTM on the candidate cell based on whether the first timer associated with the candidate cell would be valid during an (entirety of a) (RACH-less) (conditional) LTM procedure. The UE could perform RACH-based (conditional) LTM (and/or may not perform a RACH-less LTM) if or when the first timer will expire during a RACH-less (conditional) LTM procedure on the candidate cell. The UE could perform a RACH-less (conditional) LTM if or when the first timer will not expire during the RACH-less LTM procedure on the candidate cell or will not expire before completion of the RACH-less LTM procedure. Additionally and/or alternatively in certain embodiments, the UE could perform RACH-based (conditional) LTM (and/or may not perform a RACH-less LTM) if or when the remaining time of the first timer associated with the candidate cell is shorter than or equal to a threshold (when initiating or at the start of the RACH-less (conditional) LTM procedure or when an event or triggering condition is met or fulfilled (for a period of time) for initiating the RACH-less (conditional) LTM procedure). The UE could perform RACH-less (conditional) LTM (and/or may not perform a RACH-based LTM) if or when the remaining time of the first timer associated with the candidate cell is longer than or equal to a threshold (when initiating or at the start of the RACH-less (conditional) LTM procedure or when an event or triggering condition is met or fulfilled (for a period of time) for initiating the RACH-less (conditional) LTM procedure).

The threshold could be a configured value or a fixed value (associated with an (estimated) time duration of a RACH-less conditional LTM).

Additionally and/or alternatively in certain embodiments, after or in response to determining to perform/initiate a (conditional) (RACH-less) LTM on the candidate cell, the UE could determine whether to perform a RACH-less or a RACH-based LTM on the candidate cell based on whether a second timer associated with the candidate cell will expire or not during an (entirety of a) (RACH-less) (conditional) LTM procedure. The second timer could be timeAlignmentTimer associated with the candidate cell. The UE could start the second timer in response to initiation of the RACH-less LTM on the candidate cell.

Based on the First N Available CG Resource

Additionally and/or alternatively in certain embodiments, the UE could determine whether to initiate or perform the RACH-less (conditional) LTM procedure on the candidate cell based on at least whether the first timer will expire before timing/occurrence of a first N Uplink (UL) resources for transmitting a message to the network. Additionally and/or alternatively in certain embodiments, the UE could determine whether to initiate or perform the RACH-less (conditional) LTM procedure on the candidate cell based on at least whether the remaining time of the first timer will cover, reach, or exceed a timing/occurrence of a first N UL resources for transmitting the message to the network. Additionally and/or alternatively in certain embodiments, the UE could determine whether to initiate or perform the RACH-less (conditional) LTM procedure on the candidate cell based on at least whether the remaining time of the first timer will cover, reach, or exceed a timing/occurrence of a first N UL resources for transmitting the message to the network plus a time period (for the UE to receive a feedback (e.g., PDCCH) associated with the message from the network). The N could be a configurable value by the network or a fixed value (e.g., 0, 1, 2 . . . ). The first N resources could be a (Type 1) configured uplink grant for performing LTM procedures. In response to expiry of the first timer, the UE could release or clear the UL resources configured for RACH-less (conditional) LTM. Additionally and/or alternatively in certain embodiments, the UE may not use the UL resources except for performing RACH-less (conditional) LTM.

For example, if the first timer (or the second timer) will expire before a first UL resource associated with transmitting a message to the network for the RACH-less (conditional) LTM procedure, the UE may not initiate or perform the RACH-less (conditional) LTM procedure. The first UL resource could contain a Configured Grant (CG) resource configured for the candidate cell. Alternatively, the first UL resource could be a PUCCH resource for requesting a Physical Uplink Shared Channel (PUSCH) resource for transmitting the message. The message could be an RRC reconfiguration complete message. The message could be used to indicate a successful reconfiguration for the candidate cell.

Additionally and/or alternatively in certain embodiments, the UE could perform RACH-based (conditional) LTM (and/or may not perform a RACH-less LTM) if or when remaining time of the first timer associated with the candidate cell does not cover, reach, or exceed the timing/occurrence of a first N UL resources for transmitting the message to the network plus a time period (for the UE to receive a feedback (e.g., PDCCH) associated with the message from the network). Additionally and/or alternatively in certain embodiments, the UE could perform RACH-less (conditional) LTM (and/or may not perform a RACH-based LTM) if or when the remaining time of the first timer associated with the candidate cell will cover, reach, or exceed timing/occurrence of a first N UL resources for transmitting the message to the network plus a time period (for the UE to receive a feedback (e.g., PDCCH) associated with the message from the network).

Fall Back to RACH-Based

Consider (RACH-Less) LTM Fails when Timer Expires

Additionally and/or alternatively in certain embodiments, the UE could perform and/or initiate a RACH-based (conditional) LTM procedure on the candidate cell in response to expiry of the first timer or a second timer (e.g., timeAlignmentTimer) associated with the candidate cell. The UE could stop an ongoing RACH-less conditional LTM procedure on the candidate cell and/or consider the ongoing RACH-less (conditional) LTM procedure to be failed or unsuccessfully completed in response to expiry of the first timer or the second timer (before completion of the RACH-less LTM procedure). The UE could fall back to a RACH-based (conditional) LTM procedure on the candidate cell from an (unsuccessfully completed or stopped) RACH-less (conditional) LTM procedure. Additionally and/or alternatively in certain embodiments, the UE may not fall back to RACH-based LTM or may not consider the RACH-less LTM to be failed in response to expiry of the first timer or the second timer if or when a UL transmission has been performed to the candidate cell. The UL transmission could include or indicate an RRC reconfiguration complete message associated with the RACH-less LTM. The UE could consider the RACH-less LTM to be failed (only) when the message has not been sent.

The UE could perform and/or initiate a random access procedure on the candidate cell in response to:

Expiry of the first timer or the second timer (e.g., time-AlignmentTimer) associated with the candidate cell, Failure or unsuccessful completion of the RACH-less conditional LTM procedure, and/or Initiation of the RACH-based (conditional) LTM procedure on the candidate cell.

The random access procedure may not be initiated based on a Buffer Status Report (BSR) procedure and/or Scheduling Request (SR) procedure.

Various examples and embodiments of the present invention are described below. For the methods, alternatives, concepts, examples, and embodiments detailed above and herein, the following aspects and embodiments are possible, in whole or in part.

The first timer could be configured for a TAG associated with the candidate cell. The first timer associated with the candidate cell could be associated with an LTM candidate configuration of the candidate cell. The candidate cell could be a SpCell of the LTM candidate configuration. The NW could provide a MAC CE to the UE indicating a TA and/or a TAG associated with the candidate cell/the first timer. The MAC CE may not be a random access response. Alternatively in certain embodiments, the MAC CE could be a random access response. In response to receiving the MAC CE, the UE could (re) start the first timer of the candidate cell.

The length of the first timer could be indicated by the MAC CE. The MAC CE could indicate the validity time of the TA associated with the candidate cell. Additionally and/or alternatively in certain embodiments, the length of the first timer could be configured (by RRC configuration). Additionally and/or alternatively in certain embodiments, the length of the first timer could be configured in a (conditional) LTM configuration (LTM-config). Additionally and/or alternatively in certain embodiments, the length of the first timer may not be configured in a (conditional) LTM candidate configuration (LTM-Candidate). The length of the first timer could be (set to) a same value as a timeAlignmentTimer (second timer) of the candidate cell. Alternatively in certain embodiments, the length of the first timer could have a same value as timeAlignmentTimer of a Serving Cell (e.g., PCell or Primary Timing Advance Group (PTAG) or Secondary Timing Advance Group (STAG)).

The length of the first timer could be the same as the length of the second timer. Alternatively in certain embodiments, the length of the first timer could be different from the length of the second timer.

The UE could maintain one first timer for each candidate cell. Additionally and/or alternatively in certain embodiments, the UE could maintain one first timer for all candidate cell(s).

A TA associated with a TAG of a candidate cell is valid when or if a timer associated with the TAG is running (for the candidate cell). The timer could be a timer for maintaining TA for the candidate cell. The UE could be configured with one of the timers for each TAG of the candidate cell. The UE could start or restart the timer of a TAG when or if receiving a MAC CE or a signaling indicating a TA associated with the TAG. Additionally and/or alternatively in certain embodiments, the UE could perform a UE-based Timing Advance measurement to obtain/measure the TA associated with the TAG of the candidate cell.

The LTM procedure could be a conditional LTM procedure triggered by the UE (itself) (e.g., initiated or triggered by the UE not in response to receiving a LTM Cell switch command MAC CE from a NW).

The LTM procedure could be triggered by the UE in response to an event or triggering condition being met or fulfilled (for a period of time).

A candidate Cell could be configured with two TAGs. A first part of TCI state(s) or beam(s) associated with the candidate Cell could be associated with/configured with a first TAG of the two TAGs. A second part of TCI state(s) or beam(s) associated with the candidate Cell could be associated with/configured with a second TAG of the two TAGs.

A candidate cell could be a SpCell of an LTM candidate configuration (e.g., LTM-candidate).

A candidate cell could be used to replace the current SpCell.

A candidate Cell could be configured with multiple TRPs. A TRP could be associated with or replaced by one or more TCI states, one or more SSB/Channel State Information Reference Signal (CSI-RSs), a Beam Failure Detection Reference Signal (BFD-RS) set, and/or a Sounding Reference Signal (SRS) resource set. Each of the TRPs could be associated with different TAGs.

A candidate Cell could be replaced and/or is equivalent to a candidate cell.

A conditional LTM procedure on the candidate cell could be an LTM Cell switch where the UE applies RRC reconfiguration and/or LTM candidate configuration associated with the candidate cell (e.g., the candidate cell could be the SpCell of the RRC reconfiguration and/or the LTM candidate configuration)

A TAG could be associated with a tag-Id. Different TAGs could be associated with different tag-IDs.

When a UE uses/selects a configured uplink grant, the UE performs transmission on a candidate cell for an LTM procedure via (Physical Uplink Shared Channel (PUSCH) resource(s) associated with) the configured uplink grant.

The UE could perform a configured grant Type 1 PUSCH transmission on valid PUSCH occasions associated with an SSB index the same as an SSB index associated with a (selected and/or valid) configured uplink grant (for a conditional RACH-less LTM).

A configured uplink grant could be (configured to be) associated with more than one beam of the candidate cell. The UE could perform UL transmissions using the configured uplink grant via the more than one beam.

Additionally and/or alternatively in certain embodiments, the UE could be configured, by a Next Generation Node B (gNB), with a list or a set of configured uplink grants or beams for performing conditional a RACH-less LTM Cell switch on a candidate cell. The UE may not use/select configured uplink grants or beams not for conditional a RACH-less LTM Cell Switch.

The MAC reset could be performed for a MAC entity associated with an LTM candidate associated with the candidate cell.

It is noted that any of the methods, alternatives, steps, examples, and embodiments proposed herein and above may be applied independently, individually, and/or with multiple methods, alternatives, steps, examples, and embodiments combined together, in whole or in part.

Various examples and embodiments of the present invention are described below. For the methods, alternatives, concepts, examples, and embodiments detailed above and herein, the following aspects and embodiments are possible, in whole or in part.

Figure 12:
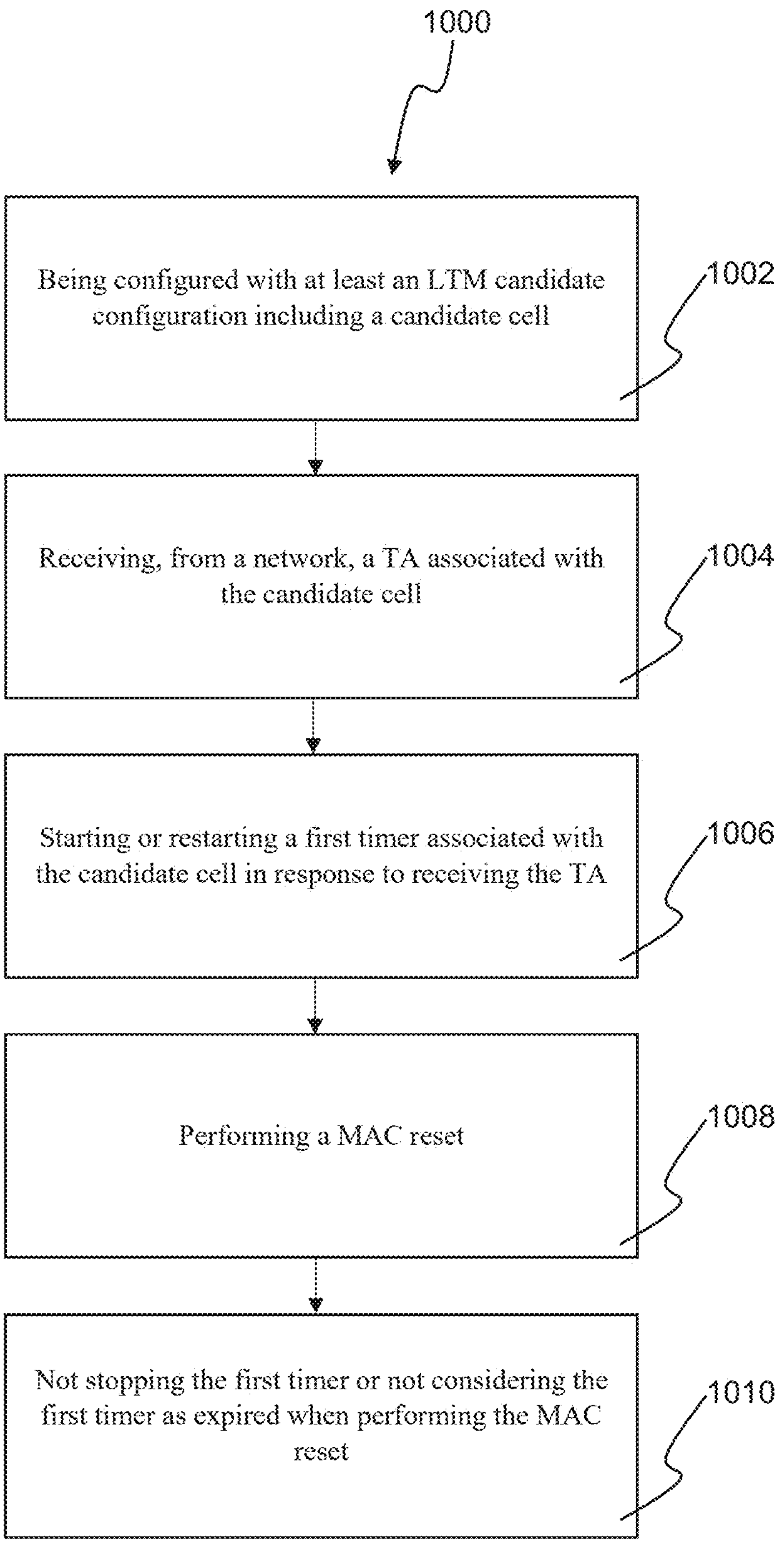
FIG. 12 is a flow diagram of a method of a UE in a wireless communication system comprising being configured with at least an LTM candidate configuration including a candidate cell, receiving, from a network, a TA associated with the candidate cell, starting or restarting a first timer associated with the candidate cell in response to receiving the TA, performing a MAC reset, and not stopping the first timer or not considering the first timer as expired when performing the MAC reset, in accordance with embodiments of the present invention.

Referring to FIG. 12, with this and other concepts, systems, and methods of the present invention, a method 1000 for a UE in a wireless communication system comprises being configured with at least an LTM candidate configuration including a candidate cell (step 1002), receiving, from a network, a TA associated with the candidate cell (step 1004), starting or restarting a first timer associated with the candidate cell in response to receiving the TA (step 1006), performing a MAC reset (step 1008), and not stopping the first timer or not considering the first timer as expired when performing the MAC reset (step 1010).

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with at least an LTM candidate configuration including a candidate cell; (ii) receive, from a network, a TA associated with the candidate cell; (iii) start or restart a first timer associated with the candidate cell in response to receiving the TA; (iv) perform a MAC reset; and (v) not stop the first timer or not considering the first timer as expired when performing the MAC reset. Moreover, the CPU 308 can execute the program code 312 to perform all of the described actions, steps, and methods described above, below, or otherwise herein.

Figure 13:
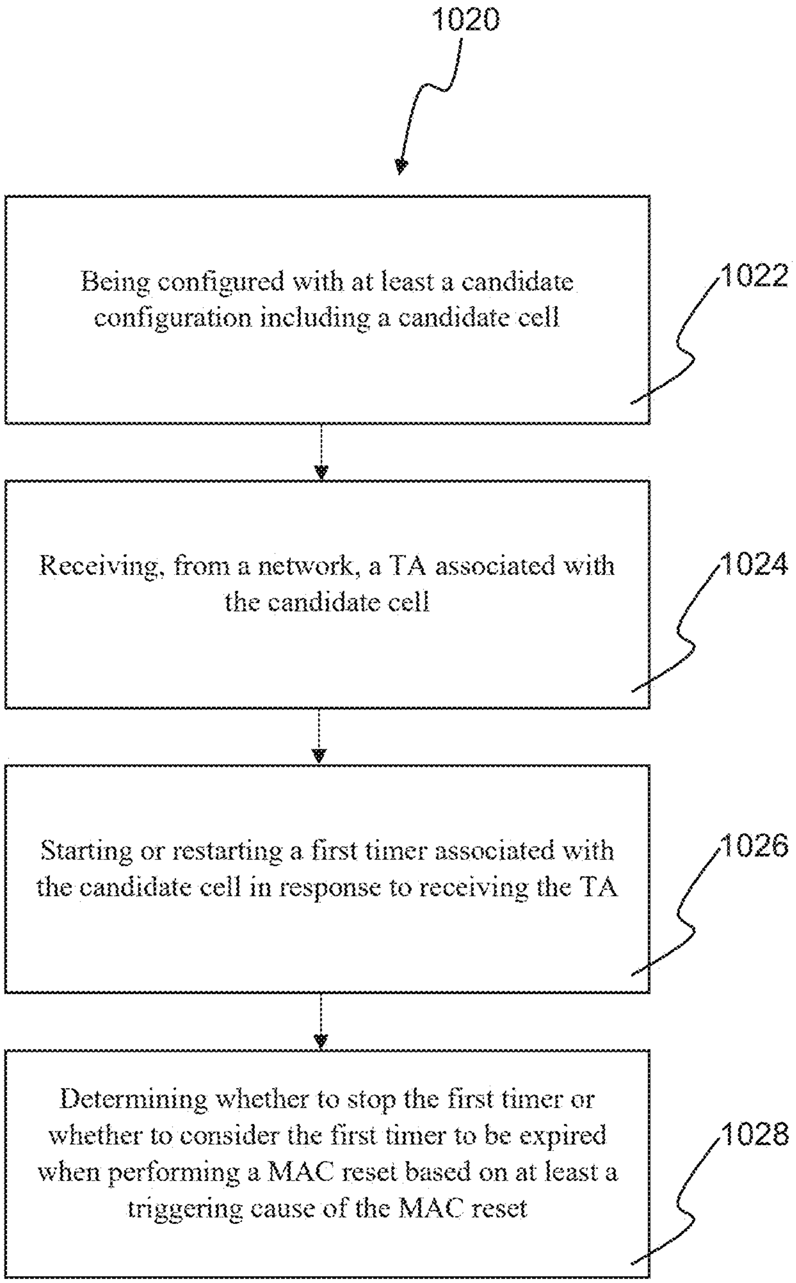
FIG. 13 is a flow diagram of a method of a UE in a wireless communication system comprising being configured with at least a candidate configuration including a candidate cell, receiving, from a network, a TA associated with the candidate cell, starting or restarting a first timer associated with the candidate cell in response to receiving the TA, and determining whether to stop the first timer or whether to consider the first timer to be expired when performing a MAC reset based on at least a triggering cause of the MAC reset, in accordance with embodiments of the present invention.

Referring to FIG. 13, with this and other concepts, systems, and methods of the present invention, a method 1020 for a UE in a wireless communication system comprises being configured with at least a candidate configuration including a candidate cell (step 1022), receiving, from a network, a TA associated with the candidate cell (step 1024), starting or restarting a first timer associated with the candidate cell in response to receiving the TA (step 1026), and determining whether to stop the first timer or whether to consider the first timer to be expired when performing a MAC reset based on at least a triggering cause of the MAC reset (step 1028).

In various embodiments, the MAC reset is performed based on or in response to an LTM Cell Switch.

In various embodiments, the LTM Cell Switch is a conditional LTM.

In various embodiments, the LTM Cell Switch is a Cell switch to the candidate cell.

In various embodiments, the LTM Cell switch is a Cell switch to a second candidate cell.

In various embodiments, the MAC reset is performed based on or in response to a radio link failure.

In various embodiments, the MAC reset is performed based on or in response to reconfiguration with sync.

In various embodiments, the MAC reset is performed based on or in response to RRC re-establishment.

In various embodiments, the UE may not stop the first timer if or when the MAC reset is performed in response to a radio link failure.

In various embodiments, the UE may stop the first timer in a MAC reset performed in response to an LTM Cell switch (on the candidate cell).

In various embodiments, the UE receives the TA via a MAC CE, and the UE starts or restarts the first timer in response to receiving the MAC CE.

In various embodiments, the UE considers the TA as valid if or when the first timer is running.

In various embodiments, when determining to perform a conditional LTM on the candidate cell, the UE performs a RACH-less LTM on the candidate cell if or when the first timer is running and/or the TA is valid.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with at least a candidate configuration including a candidate cell; (ii) receive, from a network, a TA associated with the candidate cell; (iii) start or restart a first timer associated with the candidate cell in response to receiving the TA; and (iv) determine whether to stop the first timer or whether to consider the first timer to be expired when performing a MAC reset based on at least a triggering cause of the MAC reset. Moreover, the CPU 308 can execute the program code 312 to perform all of the described actions, steps, and methods described above, below, or otherwise herein.

Figure 14:
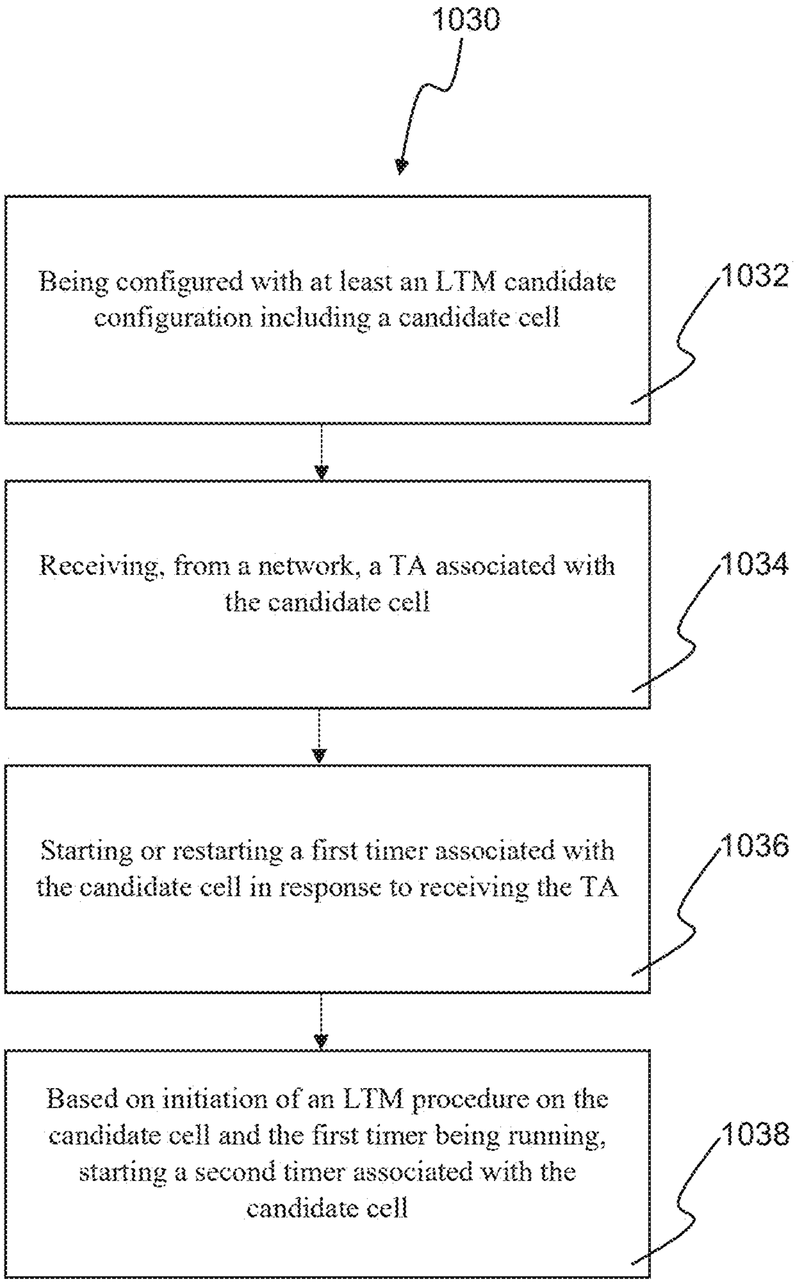
FIG. 14 is a flow diagram of a method of a UE in a wireless communication system comprising being configured with at least an LTM candidate configuration including a candidate cell, receiving, from a network, a TA associated with the candidate cell, starting or restarting a first timer associated with the candidate cell in response to receiving the TA, and based on initiation of an LTM procedure on the candidate cell and the first timer being running, starting a second timer associated with the candidate cell, in accordance with embodiments of the present invention.

Referring to FIG. 14, with this and other concepts, systems, and methods of the present invention, a method 1030 for a UE in a wireless communication system comprises being configured with at least an LTM candidate configuration including a candidate cell (step 1032), receiving, from a network, a TA associated with the candidate cell (step 1034), starting or restarting a first timer associated with the candidate cell in response to receiving the TA (step 1036), and based on initiation of an LTM procedure on the candidate cell and the first timer being running, starting a second timer associated with the candidate cell (step 1038).

In various embodiments, the UE considers the TA to be valid if or when the first timer is running.

In various embodiments, the UE does not stop or consider the first and the second timer to be expired when performing a MAC reset (associated with the LTM procedure).

In various embodiments, the LTM procedure is a conditional LTM procedure.

In various embodiments, the LTM procedure is a RACH-less LTM.

In various embodiments, the length of the first timer is configured in an LTM candidate configuration of the candidate cell or configured in an LTM configuration.

In various embodiments, the length of the first timer is indicated in a MAC CE transmitting the TA.

In various embodiments, the length of the first timer is set to a same value as the second timer.

In various embodiments, the second timer is started with a remaining time derived from at least remaining time of the first timer when the UE initiates the LTM procedure.

In various embodiments, the second timer is started or restarted at its beginning when initiating the LTM procedure.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with at least an LTM candidate configuration including a candidate cell; (ii) receive, from a network, a TA associated with the candidate cell; (iii) start or restart a first timer associated with the candidate cell in response to receiving the TA; and (iv) based on initiation of an LTM procedure on the candidate cell and the first timer being running, start a second timer associated with the candidate cell. Moreover, the CPU 308 can execute the program code 312 to perform all of the described actions, steps, and methods described above, below, or otherwise herein.

Figure 15:
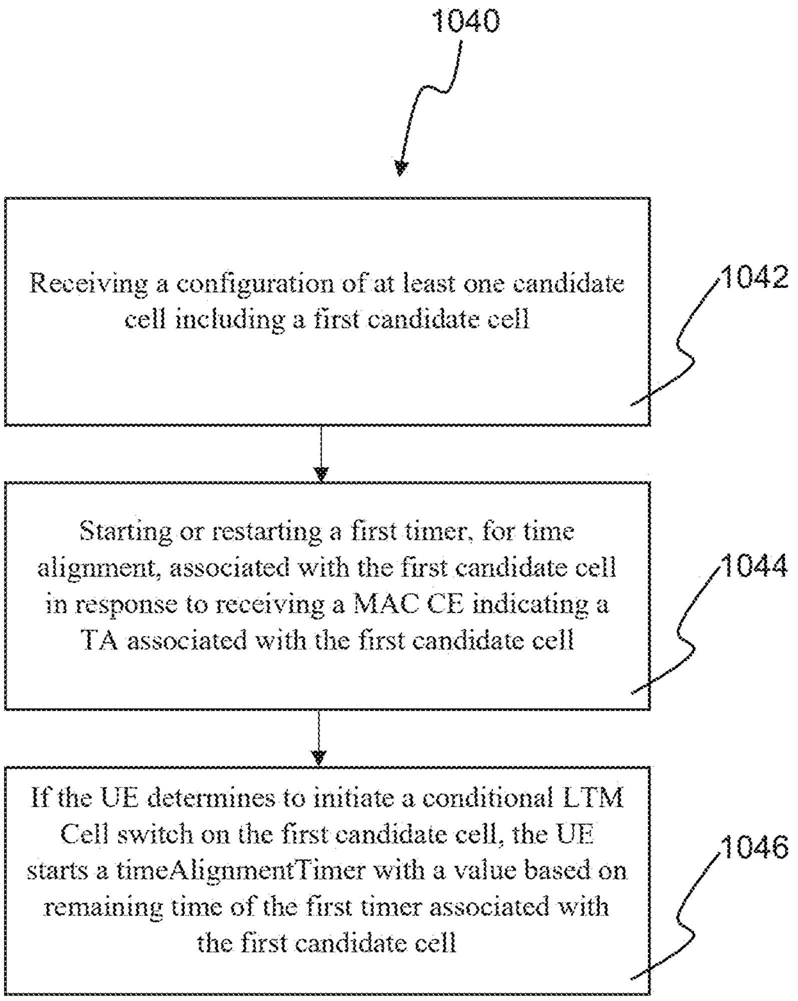
FIG. 15 is a flow diagram of a method of a UE in a wireless communication system comprising receiving a configuration of at least one candidate cell including a first candidate cell, starting or restarting a first timer, for time alignment, associated with the first candidate cell in response to receiving a MAC CE indicating a TA associated with the first candidate cell, and if the UE determines to initiate a conditional LTM Cell switch on the first candidate cell, the UE starts a timeAlignmentTimer with a value based on remaining time of the first timer associated with the first candidate cell, in accordance with embodiments of the present invention.

Referring to FIG. 15, with this and other concepts, systems, and methods of the present invention, a method 1040 for a UE in a wireless communication system comprises receiving a configuration of at least one candidate cell including a first candidate cell (step 1042), starting or restarting a first timer, for time alignment, associated with the first candidate cell in response to receiving a MAC CE indicating a TA associated with the first candidate cell (step

1044), and if the UE determines to initiate a conditional LTM Cell switch on the first candidate cell, the UE starts a timeAlignmentTimer with a value based on remaining time of the first timer associated with the first candidate cell (step 1046).

In various embodiments, the first timer is running when the UE determines to initiate the conditional LTM Cell switch on the first candidate cell.

In various embodiments, the UE considers the TA of the first candidate cell to be valid when the first timer is running.

In various embodiments, the UE determines to initiate the conditional LTM Cell switch based on an event or a triggering condition being met or fulfilled.

In various embodiments, the triggering condition or the event could be associated with beam quality associated with a Serving Cell and/or beam quality associated with the first candidate cell.

In various embodiments, the method further comprises: if the UE determines to initiate an LTM Cell switch on the first candidate cell in response to receiving an LTM Cell Switch Command MAC CE, the UE does not perform a RACH-less LTM Cell switch on the first candidate cell when the UE does not measure a second TA for the first candidate cell, a TA command value of the LTM Cell Switch Command MAC CE is set as FFF, and the first timer is running.

In various embodiments, the conditional LTM Cell switch is RACH-less.

In various embodiments, the first timer is not the timeAlignmentTimer.

In various embodiments, the timeAlignmentTimer is associated with a TAG of the first candidate cell.

In various embodiments, the UE does not stop the first timer in response to the conditional LTM Cell switch on the first candidate cell.

In various embodiments, the UE receives the MAC CE indicating the TA associated with the first candidate cell before initiating the conditional LTM Cell switch on the first candidate cell.

In various embodiments, length of the first timer is configured by the configuration.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive a configuration of at least one candidate cell including a first candidate cell; (ii) start or restart a first timer, for time alignment, associated with the first candidate cell in response to receiving a MAC CE indicating a TA associated with the first candidate cell; (iii) and if the UE determines to initiate a conditional LTM Cell switch on the first candidate cell, the UE starts a timeAlignmentTimer with a value based on remaining time of the first timer associated with the first candidate cell. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:

receiving a configuration of at least one candidate cell including a first candidate cell;

starting or restarting a first timer, for time alignment, associated with the first candidate cell in response to receiving a Medium Access Control (MAC) Control Element (CE) indicating a Timing Advance (TA) associated with the first candidate cell; and if the UE determines to initiate a conditional Layer 1 (L1)/Layer 2 (L2) Triggered Mobility (LTM) Cell switch on the first candidate cell, the UE starts a timeAlignmentTimer with a value based on remaining time of the first timer associated with the first candidate cell, wherein the timeAlignmentTimer is associated with a Timing Advance Group (TAG) of the first candidate cell and controls how long a MAC entity considers Serving Cells to the TAG to be uplink time aligned for the TAG.

2. The method of claim 1, wherein the first timer is running when the UE determines to initiate the conditional LTM Cell switch on the first candidate cell.

3. The method of claim 1, wherein the UE considers the TA of the first candidate cell to be valid when the first timer is running.

4. The method of claim 1, wherein the UE determines to initiate the conditional LTM Cell switch based on an event or a triggering condition being met or fulfilled.

5. The method of claim 4, wherein the triggering condition or the event could be associated with beam quality associated with a Serving Cell and/or beam quality associated with the first candidate cell.

6. The method of claim 1, further comprising:

if the UE determines to initiate an LTM Cell switch on the first candidate cell in response to receiving an LTM Cell Switch Command MAC CE, the UE does not perform a Random Access Channel (RACH)-less LTM Cell switch on the first candidate cell when the UE does not measure a second TA for the first candidate cell, a TA command value of the LTM Cell Switch Command MAC CE is set as FFF, and the first timer is running.

7. The method of claim 1, wherein the conditional LTM Cell switch is RACH-less.

8. The method of claim 1, wherein the first timer is not the timeAlignmentTimer.

9. The method of claim 1, wherein the UE performs and/or initiates a RACH-based conditional LTM on the first candidate cell in response to expiry of the timeAlignmentTimer.

10. The method of claim 1, wherein the UE does not stop the first timer in response to the conditional LTM Cell switch on the first candidate cell.

11. The method of claim 1, wherein the UE receives the MAC CE indicating the TA associated with the first candidate cell before initiating the conditional LTM Cell switch on the first candidate cell.

12. The method of claim 1, wherein length of the first timer is configured by the configuration.

13. A User Equipment (UE), comprising:

a memory; and a processor operatively coupled with the memory, wherein the processor is configured to execute a program code to:

receive a configuration of at least one candidate cell including a first candidate cell;

start or restart a first timer, for time alignment, associated with the first candidate cell in response to receiving a Medium Access Control (MAC) Control Element (CE) indicating a Timing Advance (TA) associated with the first candidate cell; and if the UE determines to initiate a conditional Layer 1 (L1)/Layer 2 (L2) Triggered Mobility (LTM) Cell switch on the first candidate cell, the UE starts a timeAlignmentTimer with a value based on remaining time of the first timer associated with the first candidate cell, wherein the timeAlignmentTimer is associated with a Timing Advance Group (TAG) of the first candidate cell and controls how long a MAC entity considers Serving Cells to the TAG to be uplink time aligned for the TAG.

14. The UE of claim 13, wherein the first timer is running when the UE determines to initiate the conditional LTM Cell switch on the first candidate cell.

15. The UE of claim 13, wherein the UE considers the TA of the first candidate cell to be valid when the first timer is running.

16. The UE of claim 13, wherein the UE determines to initiate the conditional LTM Cell switch based on an event or a triggering condition being met or fulfilled.

17. The UE of claim 16, wherein the triggering condition or the event could be associated with beam quality associated with a Serving Cell and/or beam quality associated with the candidate cell.

18. The UE of claim 13, further comprising:

if the UE determines to initiate an LTM Cell switch on the first candidate cell in response to receiving an LTM Cell Switch Command MAC CE, the UE does not perform a Random Access Channel (RACH)-less LTM Cell switch on the first candidate cell when the UE does not measure a second TA for the first candidate cell, a TA command value of the LTM Cell Switch Command MAC CE is set as FFF, and the first timer is running.

19. The UE of claim 13, wherein the conditional LTM Cell switch is RACH-less.

20. The UE of claim 13, wherein the first timer is not the timeAlignmentTimer.

* * * * *